United States Patent [19]
Beernink et al.

[11] Patent Number: 5,463,696
[45] Date of Patent: Oct. 31, 1995

[54] RECOGNITION SYSTEM AND METHOD FOR USER INPUTS TO A COMPUTER SYSTEM

[75] Inventors: Ernest H. Beernink, San Carlos; Giulia Pagallo, Cupertino; Radmilo Bozinovic, San Jose, all of Calif.

[73] Assignee: Apple Computer, Inc., Cupertino, Calif.

[21] Appl. No.: 270,405

[22] Filed: Jul. 5, 1994

Related U.S. Application Data

[63] Continuation of Ser. No. 889,216, May 27, 1992, abandoned.

[51] Int. Cl.$^6$ ............................................. G06K 9/00
[52] U.S. Cl. ................................... 382/186; 382/9
[58] Field of Search ............................. 382/9, 10, 13, 382/22, 25, 30, 34, 48; G06K 9/34, 9/00, 9/18, 9/46, 9/62, 9/68, 9/20

[56] References Cited

U.S. PATENT DOCUMENTS

| | | | |
|---|---|---|---|
| 4,653,107 | 3/1987 | Shojima et al. | 382/22 |
| 4,680,804 | 7/1987 | Kuzunuki et al. | 382/13 |
| 4,933,865 | 6/1990 | Yamamoto et al. | 382/25 |
| 5,034,989 | 7/1991 | Loh | 382/13 |
| 5,038,382 | 8/1991 | Lipscomb | 382/13 |
| 5,157,737 | 10/1992 | Sklarew | 382/13 |
| 5,191,622 | 3/1993 | Shojima et al. | 382/13 |
| 5,197,107 | 3/1993 | Katsuyama et al. | 382/9 |

OTHER PUBLICATIONS

O'Connor, Rory J., "Apple banking on Newton's brain," San Jose Mercury News, Apr. 22, 1992.

*Primary Examiner*—Jose L. Couso
*Attorney, Agent, or Firm*—Hickman & Beyer

[57] ABSTRACT

A technique for analyzing and interpreting user inputs to a computer, such as strokes, key depressions, or voice signals to a hand-held, pen-based computer system. Inputs to the system are received at a user interface, such as a dual function display/input screen from users in the form of pen strokes or gestures. A database stores the input data strokes and hypotheses regarding possible interpretations of the strokes. Recognition of the input strokes and recognition of higher level combinations of strokes (forming characters and words, etc.) is performed using recognizers, or recognition domains, each of which performs a particular recognition task. A controller is provided for controlling the hypotheses database and for scheduling the recognition tasks in the recognition domains. Arbitration resolves conflicts among competing hypotheses associated with each interpretation. The recognition domains, or recognizers generate two or more competing interpretations for the same input. The recognizers use a data structure called a unit, where a unit is a set of subhypotheses together with all their interpretations generated by a single recognizer. A recognizer operates at a first level for identifying one or more groups of related subhypotheses using grouping knowledge. These grouped subhypotheses generate a unit with no interpretations for each group and store the unit in the database in what is called a piece-pool memory. A recognizer has a second level of operation where each unit generated in the grouping stage is classified to provide the unit with one or more interpretations. The classified unit are stored in a unit pool memory. Two or more interpretations of the input data are combined in a hierarchical structure according to a predetermined scheme in successive steps to form higher level interpretations.

6 Claims, 16 Drawing Sheets

5,463,696

RECOGNITION SYSTEM AND METHOD FOR USER INPUTS TO A COMPUTER SYSTEM

This is a continuation of application Ser. No. 07/889,216 filed May 27, 1992 now abandoned.

BACKGROUND OF THE INVENTION

The present invention relates generally to recognition of user inputs to a computer system such as a pen-based computer system and, more particularly, to methods for analyzing the user inputs and providing interpretations of those user inputs.

A pen-based computer system is a small, often hand-held, computer system where the primary method for inputting data includes a "pen" or stylus. A typical pen-based computer system is housed in a small, rectangular enclosure, and has a dual-function display assembly having a viewing screen exposed along one of the planar sides of the enclosure. The dual-function display serves as both an input device and an output device. When operating as an input device, the display assembly senses the position of the tip of the stylus on the viewing screen and provides this information to the computer's central processing unit (CPU). Some display assemblies can also sense the pressure of the stylus on the screen to provide further information to the CPU. When operating as an output device, the screen displays computer-generated images developed by the CPU.

The dual-function display assemblies of pen-based computer systems permit users to operate the computer as a computerized notepad. For example, graphical images can be input into the pen-based computer by merely moving the stylus over the surface of the screen. As the CPU senses the position and movement of the stylus, it generates a corresponding image on the screen to create the illusion that the stylus is drawing the image directly upon the screen. With suitable recognition software, text and numeric information can also be entered into the pen-based computer system in a similar fashion.

What is needed is a system for recognition of user inputs to a computer system such as a pen-based system and for analysing the user inputs to determine possible meanings.

SUMMARY OF THE INVENTION

The present invention provides a system and a method for analyzing and interpreting user inputs to a computer, such as a hand-held, pen-based computer system, described herein. Inputs are received at a user interface, such as a dual function display/input screen, from users in the form of pen strokes or gestures. These pen strokes or gestures are preferably input into the CPU as an array of X and Y data points corresponding to the path of a stylus across the display/input screen. A database stores the input data points and hypotheses regarding possible interpretations of the strokes represented by the array of data points. Recognition of the input strokes and recognition of higher level combinations of strokes (forming characters and words, etc.) is performed using recognition domains, each of which performs a particular recognition task. A controller is provided for the recognition domains. An arbiter is provided for resolving conflicts among competing hypotheses The recognition domains, or recognizers generate one or more competing interpretations for the same input. The recognizers use a data structure called a unit, where a unit is a set of subhypotheses together with all their interpretations generated by a single recognizer. An interpretation is a description of a particular portion of the input data (strokes), where the description is based on the strokes or on other lower-level interpretations. A recognizer operates at a first level for identifying one or more groups of related subhypotheses using the unit absent any interpretations and stores the unit in the database in piece-pool memory. A recognizer has a second level of operation where each unit generated in the grouping stage is classified to provide the unit with one or more interpretations. The classified unit is stored in a unit pool memory.

One or more interpretations of the input data are combined in a hierarchical structure according to a predetermined scheme in successive steps to form higher level interpretations.

For a given hierarchy, an independent recognition domain has two required parts and one optional part. The required parts are: (1) information to establish the position of the domain in the hierarchy, and (2) knowledge about how to perform a particular recognition task; and the optional part is conditions and context constraints that the input data has to satisfy to be considered for recognition by a recognizer. The information to establish a domain as a part of a given hierarchy is information about which type of hypotheses the domain takes as input and information about which type of hypothesis the domain generates so that the type of input hypotheses for a domain uniquely establishes its position in the hierarchy. The knowledge on how to perform a particular recognition task is subdivided into two parts, where one part is the grouping knowledge for deciding which of the available strokes or hypotheses should be considered as a whole to form a new interpretation, and where the other part is classification knowledge for generating a list of interpretations from a given set of hypotheses.

A hypothesis is removed from the database when it reaches the top of the recognition hierarchy and any conflicts with another hypothesis have been resolved by the arbitration process. When a hypothesis is removed from the database, its supporting hierarchy of hypotheses, down to the constituent strokes, is removed from the database and all other hypotheses in the database that refer to the these constituent strokes, or the hypotheses that use them, are removed.

The means for extracting information from each isolated portion of the input data, the means for assigning an interpretation to each portion of the input data; the means for combining two or more interpretations of the input data to form new more integrated interpretations; the additional means for combining two or more new interpretations to form newer interpretations until a fully integrated interpretation of the input data is formed, and the means for combining two or more interpretations of the input data to form new more integrated interpretations includes a recognition hierarchy for the task of recognizing, for example, handwritten words and simple graphical shapes.

The controller, or control unit, includes means for deducing from the information provided by the recognizers, or domains, precisely which domains should be active within a specific area of the user-input screen of, for example, a pen-based system. For recognition of words, the control unit uses a character-part domain, a character domain, and a word domain within that specific area. Means are provided for pre-computing for each recognition area of a user screen what action the recognizer should take when an input of each of the expected types is seen within that area.

The system can resolve conflicts among competing hypotheses and determines when the recognition process is completed for a given stroke or set of strokes. The system provides means for generating a hypothesis; means for registering and accumulating all of the hypotheses generated by each different recognizer; and means for finding those hypotheses that best account for the input data. One technique for finding those hypotheses that best account for the input data includes means for comparing both the scores of the various interpretations, and the strokes that are accounted for by those interpretations. If the score of the best hypothesis is clearly better than that of competing hypotheses, the recognized object is emited to the user module so that the user module that requested the object can then examine its own context and decide whether or not to accept the interpretation.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

A Pen-Based Computer System

Figure 1:
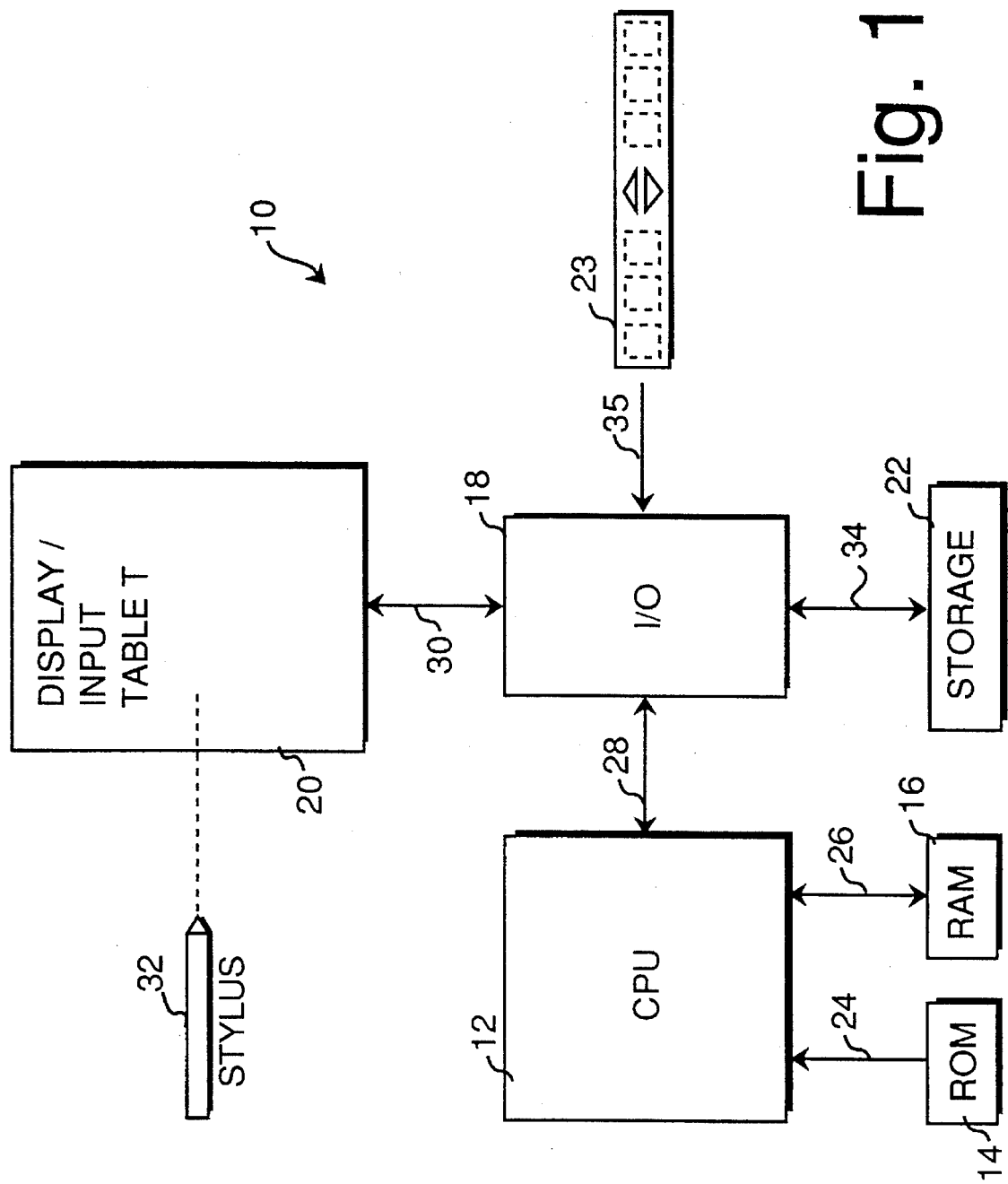
FIG. 1 is a block diagram of a pen-based computer system in which the present invention is used.

In FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or non-volatile memory such as flash memory, and an array of input buttons 23.

The CPU 12 is preferably a commercially-available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a uni-directional data bus 24. ROM 14 contains the basic operating system for the pen-based computer system 10. CPU 12 is connected to RAM 16 by a bi-directional data bus 26 to permit the use of RAM 16 as scratch pad memory. ROM 14 and RAM 16 are also coupled to CPU 12 by appropriate control and address busses, as is well known to those skilled in the art. CPU 12 is further coupled to the I/O circuitry 18 by bi-directional data bus 28 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the array of input buttons 23.

Display assembly 20 of pen-based computer system 10 is both an input and an output device. Accordingly, it is coupled to I/O circuitry 18 by a bi-directional data bus 30. When operating as an output device, the display assembly 20 receives data from I/O circuitry 18 via bus 30 and displays that data on a suitable screen. The screen for display assembly 20 is preferably a commercially available liquid crystal display (LCD) which is available from a variety of manufacturers. The input device of display assembly 20 is preferably a thin, clear membrane which covers the LCD display and which is sensitive to the position of a stylus 32 on its surface. These position-sensitive membranes are also readily available on the commercial market. Combination display assemblies such as display assembly 20 which include both the LCD output screen and the input membrane are commercially available from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen. Therefore, as used herein, the terms "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In this instance, the RAM 16 can be provided with a back-up battery to prevent the loss of data even when the pen-based computer system 10 is turned off. However, it is generally desirable to have some type of long term storage 22 such as a commercially available miniature hard disk drive, or non-volatile memory such as flash memory or battery-backed RAM.

In operation, information is input into the pen-based computer system 10 by "writing" on the screen of display assembly 20 with the stylus 32. Information concerning the location of the stylus 32 on the screen of the display assembly 20 is input into the CPU via I/O circuitry 18. The CPU 12 then processes the data under control of an operating system and/or application program stored in ROM 14 and/or RAM 16. The CPU 12 then produces data which is output to the display assembly 20 to produce appropriate images on its screen.

Figure 2:
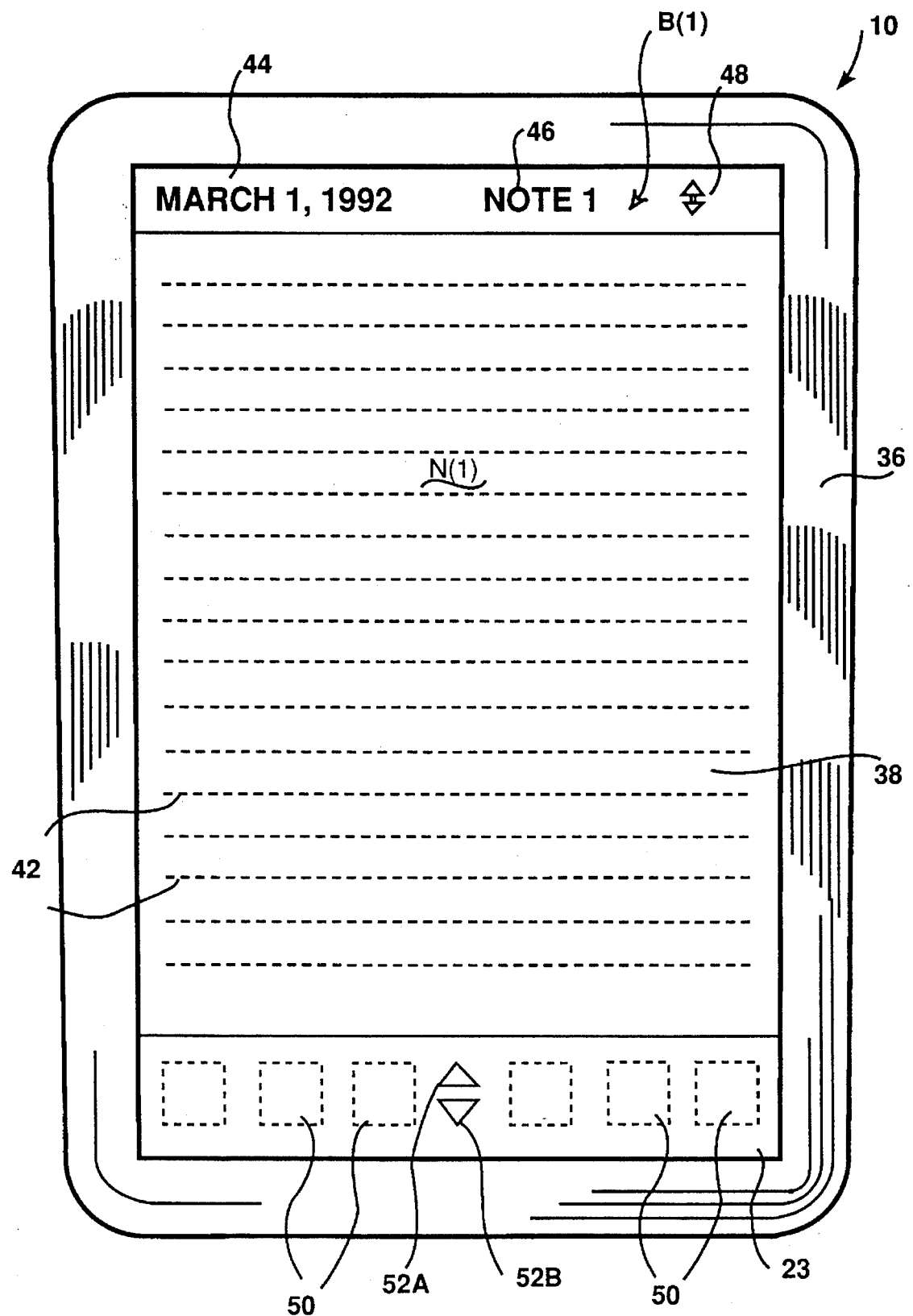
FIG. 2 is a pictorial representation of the screen of a computer display assembly in accordance with the present invention.

In FIG. 2, the pen-based computer system 10 is shown housed within an enclosure 36. The CPU 12, ROM 14, RAM 16, I/O circuitry 18, and mass storage 22 are preferably fully enclosed within the enclosure 36. The display assembly 20 is mostly enclosed within the enclosure 36, but exposes a viewing screen 38. As used herein, the term "screen" will refer to the portion of the display assembly 20 which can display an image that can be viewed by a user. Also accessible to the user are the array of input buttons 23.

RECOGNITION ARCHITECTURE

Figure 3:
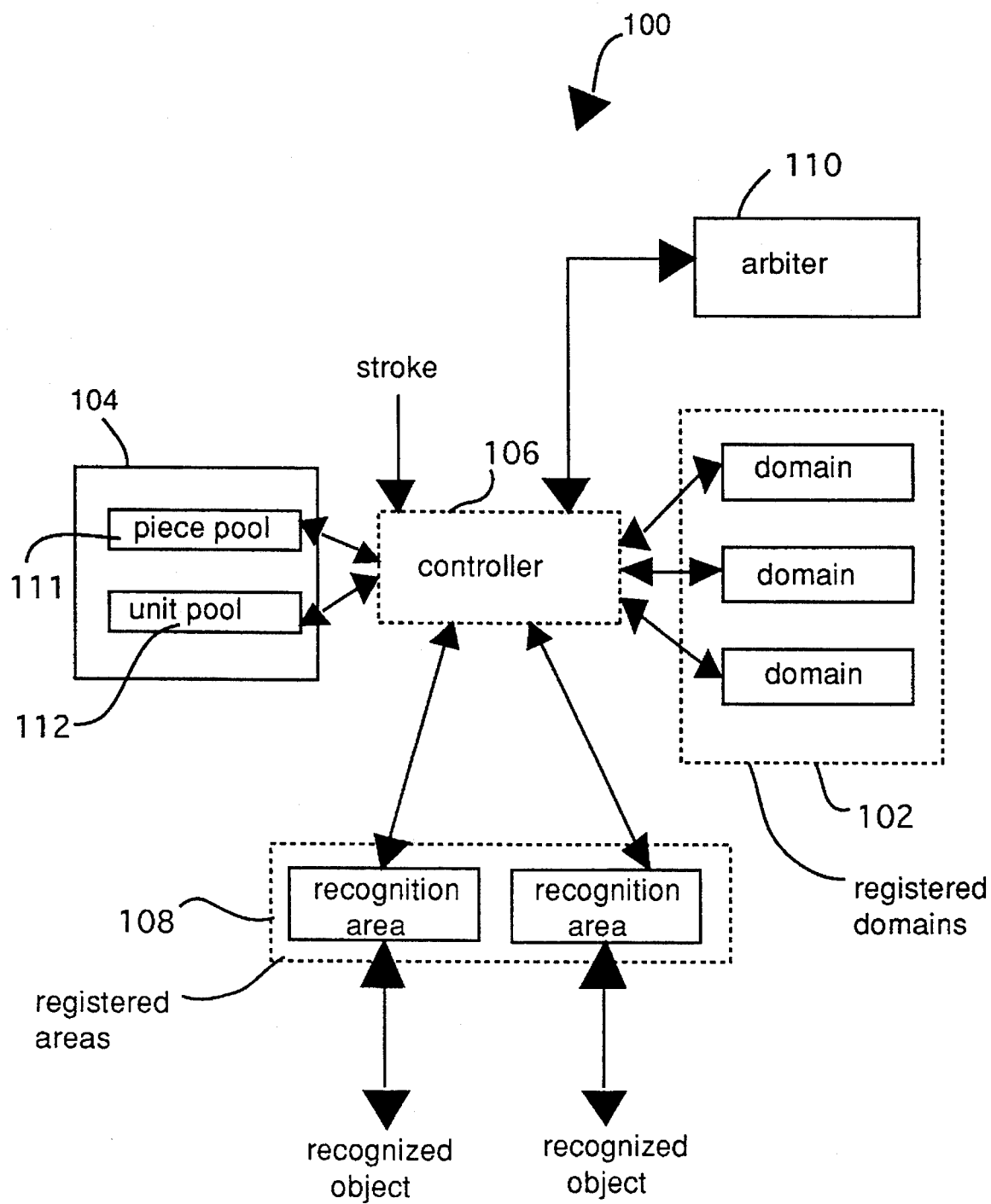
FIG. 3 is a simplified block diagram modelling the architecture of a recognition system in accordance with the present invention.

FIG. 3 is a block diagram of a preferred recognition architecture 100 of a recognition system of the present invention. This recognition architecture depicts the organization of a system of data structures and procedures for analyzing user inputs to a computer and for determining possible interpretations of those user inputs. The following describes the organization of the knowledge and data within the recognition architecture model and the problem solving approach taken using object-oriented programming techniques and terminology.

For a pen-based computer the user inputs are in the form of strokes of a pen drawn on an electronic tablet, keystrokes, and voice inputs. This recognition model can also be extended to other input sources, including those of non-human origin. In places where the handwritten inputs are described as characters or words, these inputs can also be numbers, formulas, or graphic diagrams.

The recognition architecture model 100 consists of several basic system components: recognition domain group 102; database 104; a control unit 106; recognition areas 108; and an arbiter 110.

The recognition domain group 102 includes a number of recognition domains. A recognition domain is a recognizer, which contains the knowledge and methods required to recognize a particular object (for instance, characters or words).

The database 104 contains two arrays: a piece pool 111 and a unit pool 112. These two arrays store the input data strokes to the recognition system and the active recognition hypotheses. The recognition domains perform changes to the strokes and hypotheses (via the controller). These changes lead progressively to the recognition of the input. The pool mechanism eliminates the need for direct communication between domains while providing a uniform communication mechanism.

The controller, or control unit 106, manages the whole process. It maintains communication with the recognition areas. It stores and retrieves hypotheses from the unit and piece pools and ensures their consistency. It hands the hypotheses to the appropriate domains for recognition.

The recognition areas are determined by application components, which specify areas of the pen-based screen (a text field, for instance) and the type of objects that are expected in these areas. The controller maintains a list of these areas, and when an object of the specified type (a word, for instance) is recognized within an area, the controller passes the object back to the application component.

A recognition domain 102 includes the knowledge and procedures to perform a particular recognition task (e.g. word recognition, paragraph recognition). Recognition domains are independent and are organized into a hierarchy.

The database 104 stores the input data (strokes) to the recognition system and the active recognition hypotheses. The recognition domains 102 perform changes to strokes and hypotheses in the database 104. These changes lead progressively to recognition of the input under the control of the controller, or control unit 106, which manages the database 104 and schedules the recognition tasks. A recognition domain 102 does not have direct access to the database 104. Rather, the control unit 106 provides, according to a schedule, appropriate strokes or hypotheses to each recognition domain 102 for recognition. Then, some time later, the recognition domain 102 returns to the control unit 106 new hypotheses for storage into the database 102.

The arbiter 110 coexists with the controller and resolves conflicts among competing hypothesis and also determines when the recognition process is completed for a given stroke or set of strokes. The recognized unit is then returned to the application program which requested recognition. The application extracts information from the recognized unit and verifies to the controller 106 that the extraction has taken place. After this verification, the controller 106 removes the recognized unit and all units related to the recognized unit from the memory arrays 104.

Recognition Areas

In order to receive input, an application needs to specify an area of the display/input screen and the type of object it expects in that area. This process is known as registering an area. A toolbox provides the view class for this purpose. A recognition area is represented by the TRecArea class:

```
class TRecArea : public TObject {
    public:
        ULong    fArea;
        TTypeAssoc   *fATypes;     // arbitration unit types
        TTypeAssoc   *fGTypes;     // grouping unit types
                     // classification unit types = atypes + gtypes
    public:
        static TRecArea *Make(ULong area, ULong flags);
        void Dispose(void);
        void AddAType(ULong atype, ULong (*Handler)
(TSIUnit *, ULong, dInfoRec *),
             dInfoRec *dInfo);
};
```

The controller maintains a list of registered areas. When a new unit is presented to the recognition system (usually a stroke), the controller searches its list to determine which of the reas registered by the application are hit by the new unit. An area is "hit" if the unit is more than half in the area. This measurement is based on the bounding rectangles of the areas and unit, and their intersection.

All the areas hit by this unit are collected into a list known as an AreaList. This AreaList is then stored into the unit itself. It is also stored into all units that are derived from this original unit. An advantage of this technique is that when a new classification is assigned to a unit, the unit's areaList can be scanned directly to determine who should be called next, and no redundant searching of the controller's areas is necessary. The controller maintains data structures that help it perform only the necessary types of recognition in each area. If the area is no longer needed, the method RemoveArea can be called, with the id returned by RegisterArea as parameter.

The application that is interested in having recognition performed in a particular area called the TController method RegisterArea, specifying the type of area, the area, the type of units that it wants recognized, and a routine to be called when an object of the appropriate type is recognized (the "Display" routine). The area is passed in as a rectShape (whose structure may vary, depending on the graphics system in use). An area can be created by calling GNewRShape. The unit type is the same type that is passed to the initialize routine of the domain that recognizes units of that type. The display routine is also discussed below.

There is an alternate method for registering areas which allows multiple types of things to be recognized within a single area. To do this, you must first create a new recognition area by calling TRecArea::Make, and passing in the rectShape that defines the area. Next you specify the types of units that should be recognized, calling TRecArea::AddAType once for each type to be added (and a "Display" routine for each). Once all types have been added, call TController::BuildAndRegister on the area. In the section on Display routines, below, there is further description of the way that you are notified when recognition occurs.

Hierarchical Recognition Structure

Figure 4:
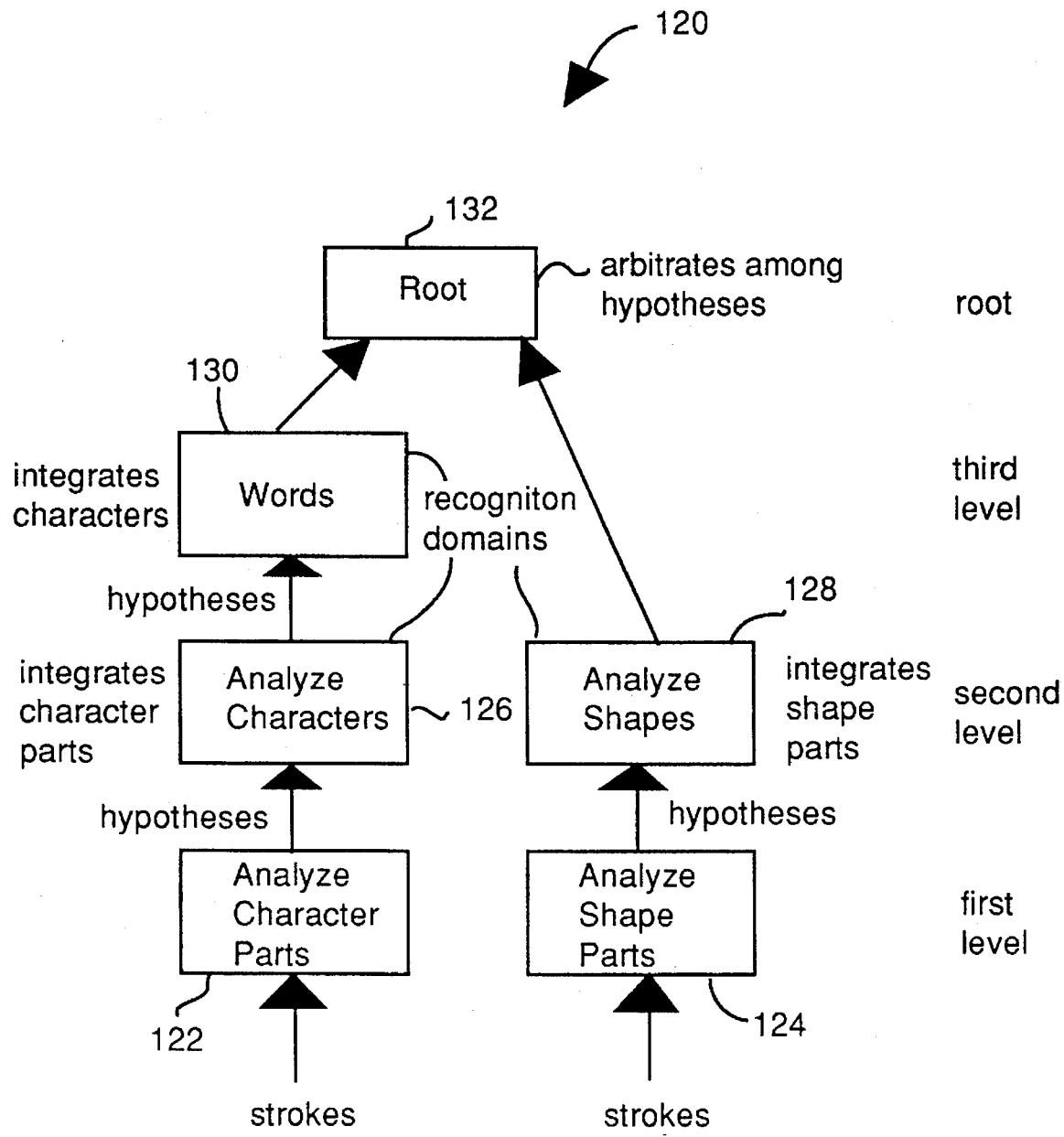
FIG. 4 is a diagram illustrating a simple recognition hierarchy for recognition of words and simple-shape graphics.

FIG. 4 illustrates a simple recognition hierarchical structure 120 for recognition of words and simple-shape graphics. It uses a problem solving technique called a bottom-up approach for solving a complex recognition problem. The first step is to isolate portions of the input data. The next step is to extract information from each isolated portion. Then an interpretation is assigned to each portion. Following this, one or more interpretations of the input data are combined to form new, more integrated interpretation. Some of the new interpretations are then combined to form newer interpretations, and so on, until a fully integrated interpretation of the input data has been formed.

A bottom-up recognition approach is visualized by a hierarchical structure, or hierarchy, where each node in the hierarchy performs some type of recognition. The lowest level in the hierarchy is the level closest to the data and the level below the root node represents the last level of integration among hypotheses. At the root node of the hierarchy, if there are competing hypothesis for the data, the best one is chosen according to some criterion. We will refer to lowest level in the hierarchy as the first level, to the next level up as the second level and so on.

FIG. 4 presents an example of a simple recognition hierarchical structure 120 for the task of recognizing handwritten words and simple graphical shapes as inputs. This recognition hierarchy is used to illustrate many of the issues that arise in the recognition process.

To explain the recognition process in more detail it is necessary to introduce two terms: interpretation and hypothesis. An interpretation is a description of a portion of the input data (strokes). This description may be based directly on the strokes or it may be based on other interpretations. For example, if we are given the strokes representing the script letters "c", "a", "r", an interpretation of these strokes is the word "car". This interpretation may be based directly on the fact that the strokes form such a word; or it may be based on the fact that the strokes are interpreted as the letters c, a and r, and that the word car is made up by these three interpretations. A hypothesis is a portion of the input data together with an interpretation of the data. A hypothesis may be derived directly from the input data or from other hypothesis.

In the simple recognition hierarchical structure 120 of FIG. 4, there are two nodes 122, 124 at the first level and two nodes 126, 128 at the second level. There is one node 130 at the third level. At the highest, or root node, 132 is performed an arbitration process among the various hypotehesis produced. The left node 122 at the first level isolates strokes and recognizes character parts. The right node 124 at the first level isolates strokes and recognizes graphical shape parts. The left node 126 at the second level integrates character parts to form character interpretations, and the right node 128 integrates shape parts to form shape interpretations. Finally, the node 130 at the third level integrates characters to form words. At the root node 132, arbitration among hypotheses takes place when necessary.

In the simple recognition hierarchical structure 120, the bottom-up approach to recognition of handwritten data is utilized, where a recognition domain is at each node of the hierarchy, except the root node. A recognition domain can be thought of as an element that encapsulates all the knowledge necessary to perform a well defined recognition task. Recognition domains are discussed in more detail herein after. The recognition domains 122, 124 at the first level in the hierarchy isolate a stroke or set of strokes from the input and produce very simple hypotheses by analyzing the strokes (e.g. character parts, shape parts). The recognition domains 126, 128 at the second level in the hierarchy select some of the hypotheses generated by the domains at the first level, and generate new hypotheses by combining the ones that were selected (e.g. characters, shapes). The domains at the next levels proceed in the same fashion until the top of the hierarchy is reached.

In order for recognition to be successfully completed using the bottom-up approach proposed, several additional problems need to be solved. One problem to solve is hypothesis proliferation. By this we mean to prevent the number of hypotheses present in the system at any given time from growing without bounds. A second problem to solve is the arbitration of conflicting and competing hypotheses. This problem arises because recognition domains are independent from each other and may propose alternative interpretations for the same data. We say that two or more hypotheses are competing hypotheses if they use the same subhypotheses, and that two or more hypotheses are conflicting hypotheses if they share a subhypothesis.

In this system, both problems are solved with some help provided by the recognition domains. To prevent hypothesis proliferation, each recognition domain is required to keep the number of hypotheses it proposes under a given limit. To help arbitration, each domain assigns a numerical value to its hypotheses. This numerical value is called a score. The score of a hypothesis reflects the degree of confidence that the domain has in the hypothesis. The controller and the application interact to handle a recognized object and cleanup units after being claimed by an application.

The recognition task is accomplished by independent recognition domains organized into a hierarchical structure. Essentially, for a given hierarchy, a recognition domain has two required parts and one optional part. The required parts are: (1) information to establish the position of the domain in the hierarchy, and (2) knowledge about how to perform a particular recognition task. The optional part of a recognition domain is concerned with conditions that the input data has to satisfy to be considered for recognition by the domain and context constraints for recognition.

The information to establish a domain as a part of a given hierarchy is which type of hypotheses the domain takes as input and which type of hypothesis the recognition domain generates. The type of input hypotheses for a recognition domain uniquely establishes its position in the hierarchy.

The knowledge of how to perform a particular recognition task can be thought of as being subdivided into two parts, grouping knowledge and classification knowledge. Grouping knowledge is the knowledge for deciding which of the available strokes or hypotheses should be considered as a whole to form a new interpretation. Classification knowledge is the knowledge for generating a new interpretation from a given set of hypotheses.

The optional part of a recognition domain provides a mechanism for ensuring that a hypothesis produced by a recognition domain satisfies some pre-established constraints. For instance, in an application that has fields or areas in a form, we may want to specify an area which will accept only date information. Hence, we need a mechanism to specify that the input data to the field can only be recognized as a date and is rejected if it is not a date. Thus each recognition domain can provide a grammar, or rulebook, for limiting and sequencing its inputs.

Referring back to FIG. 3, in the recognition architecture model 100 of FIG. 3, strokes are stored in the piece pool 111 of the database 104. In addition, the intermediate hypotheses generated by the domains during a recognition task are also stored in the unit pool 112 of the database 104. The database 104 eliminates the need for direct communication among recognition domains while providing an indirect, but uniform, communication mechanism between recognition domains.

A stroke is stored in the piece pool 111 of the database 104 as it enters the system. As the various levels of the recognition domains in the recognition heirarchy are activated, these recognition domains store their hypotheses in the database 104. A hypothesis is removed from the database 104 when it reaches the top of the recognition hierarchy and any conflicts with another hypothesis has been resolved by the arbiter 110. When a hypothesis is removed from the database 104, its supporting hierarchy of hypotheses, down to the constituent strokes, is removed from the database 104. In addition all other hypotheses in the database 104 that refer to the these constituent strokes, or the hypotheses that use them, are removed.

In this system, control function for the system is centered in the control unit 106. The control unit 106 has three main functions: 1) the control unit 106 stores and retrieves hypotheses from the database 104 and it ensures the integrity of the database 104; 2) the control unit 106 hands the appropriate hypotheses to the recognition domains 102 for grouping and classification; and 3) the control unit 106 schedules grouping and classification tasks.

The recognition function involves the use of recognition areas. A recognition area is a specific area on the input screen of a pen-based computer. When a recognition client (such as a document) wants to perform specific types of recognition in a specific area, the recognition client informs the control unit 106 about the types of recognition that the recognition client is interested in. The recognition client also informs the control unit about the screen areas, in which information is to be recognized. The control unit 106 deduces from the information provided by the recognition domains, precisely which recognition domains should be active within a designated area of the screen. For example, if an area is only interested in words, then the control unit 106 concludes that it should use the character-part domain, the character domain, and the word domain within that area.

The control unit 106 pre-computes for each recognition area what action it should take when an input of each of the expected types is seen within that area. This allows the control unit 106 to make a rapid decision as to which recognition domains are needed to process an input. This also helps to avoid redundant processing. For instance, if an area is looking for both dates and phone numbers, the number recognizer domain would only be invoked only once for each input because both dates and phone numbers are dependent on numeric input.

When a top-level recognition domain generates a hypothesis, this hypothesis is registered with the arbiter 110. The arbiter 110 is in charge of accumulating all the hypotheses generated by the different recognizers. The arbiter then finds those hypotheses that best account for the input data. It does this by comparing both the scores of the various interpretations as well as the strokes that are accounted for by those interpretations.

Once the arbiter 110 has performed these comparisons, it can take one of several actions. If the score of the best hypothesis is clearly better than that of competing hypotheses, then the arbiter 110 can simply emit, or transmit, the recognized object (according to some user-defined threshhold) to the recognition client. The recognition-client module that requested recognition of the object can then examine its own context and decide whether or not to accept the recognition system's interpretation. If the recognition-client module does not accept the recognition system's interpretation, then the arbiter 110 can try again with the its next best interpretation. If there are multiple competing hypotheses, then the arbiter 110 instead provides a signal to the recognition-client module that there was not a single clear answer. The external system for the recognition client can then interrogate the arbiter 110 to discover what the various interpretations are in order to permit the external system to select an interpretation.

Implementation of the recognition process may produce situations where, during classification, a recognition domain may generate two or more competing interpretations for the same the input. For example, a character recognition domain may give two conflicting interpretations for ambiguously drawn character parts, such as a vertical line followed by a horizontal line. A first interpretation of such character parts could be the "+" character. A second interpretation of such character parts could be the characters "1–". To reduce arbitration among competing hypothesis that are generated by the same recognition domain, we use a data structure called a unit. A unit is a set of subhypotheses generated by a single recognition domain together with all of the interpretations of each of the subhypotheses.

For each recognition domain, recognition is achieved in two stages. In the first stage, one or more groups of related subhypotheses are identified using the domain grouping knowledge. As a result of this first grouping stage, the recognition domain generates a unit with no interpretations for each group. Such units are sent by the control unit 106 into the database 104. In the second classification stage, each of the units generated in the grouping stage is passed to the recognition domain for classification. At the end of this classification stage, the unit has one or more interpretations and is stored back in the database 104.

Each entry in the database 104 is a unit. For uniformity, a stroke unit is a unit with a single interpretation. A stroke unit has no subhypothesis and the stroke sample points are the unit interpretation.

During the recognition process, there are two kinds of units in the database: units without interpretations (after grouping is performed but before classification) and units with interpretations (after classification is performed). In one implementation, the two kinds of units are kept in two separate databases to simplify management of these units. The first of these databases is called a piece pool, which contains unclassified units. The second of these databases is called a unit pool, which contained classified units.

The Recognition Interface

This use of the recognition architecture is described in the following. The description covers only the process of recognition, not how recognized things turn into objects presented on the screen, or how objects on the screen interact with things that are being recognized. The sequences of computer code used to implement the methods and systems of the invention were written to be compatible with both Think C 5.0 and C++ and to observe the object-oriented programming (OOP) conventions of these programming languages.

Recognition Classes TController, TDomain, and TUnit

There is a single class, TController, that is in charge of recognition. All incoming information is given to the controller, and the controller is responsible for distributing it to the pieces of computer code that actually do the recognition. A code module that performs recognition is referred to as a recognizer. A recognizer can be one of two types of classes: one that embodies the recognition process (a subclass of TDomain), and one that describes the data structure that is formed as a result of classification (a subclass of TUnit).

A TUnit class contains some information, and has a type that specifies the precise nature of that information. For instance, TStrokeUnit contains a stroke in a specific stroke format.

A TDomain class specifies the type of TUnit on which it wishes to perform classification, and the type of TUnit which it produces as a result of classification. A class TCharDomain can specify that it desires TStrokeUnits as input and that it produces TCharUnits as output. A class TWordDomain can specify that it desires TCharUnits as input and produces TWordUnits as output. Each of these subclasses of TUnit have standard interfaces so that more than one recognizer can use them as inputs.

Subclasses of TDomain

Each recognizer domain has a class that is a subclass of TDomain. The recognizer domain is created and initialized by a call to its Make method. A call to each domain's Make method can be performed in a main() program module. The Make method should initialize all recognizer domain specific fields. It should specify all unit types that it desires as input (AddPieceType). It should specify the type of unit that it produces as output. It should call the controller 106 method Register to register itself as a new recognition domain. The controller stores in each unit the recognition domain that created it so that the controller knows where method calls should be dispatched.

A delay field of the recognizer domain is set to a non-zero value to perform classification after a specific time interval. The delay is measured units of 1/60th of a second.

The Group Method

The two important methods, or routines, that are implemented by every recognition domain are Group and Classify. When the controller gets a new unit, it calls the Group method of each recognition domain that is interested in units of that type. In a trivial case, the Group method would create a new unit of the output type of that domain, assign the input unit as a subobject of the output unit, and then call a controller method NewGroup to inform the controller that a new group has been formed. In a less trivial case, the Group method would add the new unit to an existing group.

The Classify Method

The controller maintains a list of these units. The controller looks at the delay field specified by the recognizer domain to determine how long the controller should wait before calling the Classify method on each group. If delay is set to zero (the default), then Classify is called immediately. Otherwise it waits (delay/60 seconds) before calling Classify. The delay is measured from the last time a unit was added to the group (using AddSub).

The Classify method should attempt to classify the collection of units that have been grouped together into a single unit, and then store the interpretation(s) in the unit, as described below. Once classification has been successfully performed, and all the interpretations have been stored, the Classify method should call the controller method NewClassification. This will make the newly classified unit available as input to the next level of recognizer domains.

There are several reasons that Group and Classify are separate methods. The most important is so that a domain has a chance to perform analysis on a set of inputs before deciding how to do classification. For example, Group might decide that one input clearly doesn't belong with the rest of the set, and reject it from the group. Alternately, Group might decide that there are two equally valid groupings of the set of inputs and generate multiple groups to be separately classified. Another reason is so that Classification can be set up as a lower priority task than Grouping. For example, a new input could modify a group that is currently being classified; and a higher priority Group method might cause the classification task to be terminated.

Subclasses of TUnit

It is apparent that class TUnit and its subclasses are the fundamental units of information that are handled by the controller. TUnit is the basic unit. It contains the minimal information necessary for the controller to dispatch it to the appropriate recognizers. Only events such as strokes, clicks, or keystrokes are stored as TUnits. TSlUnits are subclassed from TUnits, and they have subobjects and interpretations. Any domain that groups and classifies units stores the input units as subobjects of the output unit. Units are added as subobjects using the method AddSub.

Grouping Example

Assume that there is a domain TCharDomain that wants to group TStrokeUnits into a TCharUnit. First of all, the domain should have its delay field set to a non-zero value. When the Group method calls AddSub to add the input unit to the output unit, the group's time field is set to the current time plus the domain's delay. This instructs the controller not to call TCharDomain to perform classification on the TCharUnit until that time has been reached. When subsequent TStrokeUnits arrive, TCharDomain can get a list of all partial characters by calling GetDelayList(charUnitType). It can then see if the new stroke should be added to any of those partial characters.

If the Group method can determine that a partial character is no longer eligible for further grouping, it calls the method EndSubs() on the partial character. For instance, you might want to call EndSubs on all partial characters that are not hit by an incoming stroke. After EndSubs has been called, Classify is called immediately on that group. If a new stroke causes some partial group to become invalid for some reason (too many strokes, stroke too big), Invalidate() can be called on the unit and it will never be classified or returned as a partial again.

Screen Areas

Figure 5:
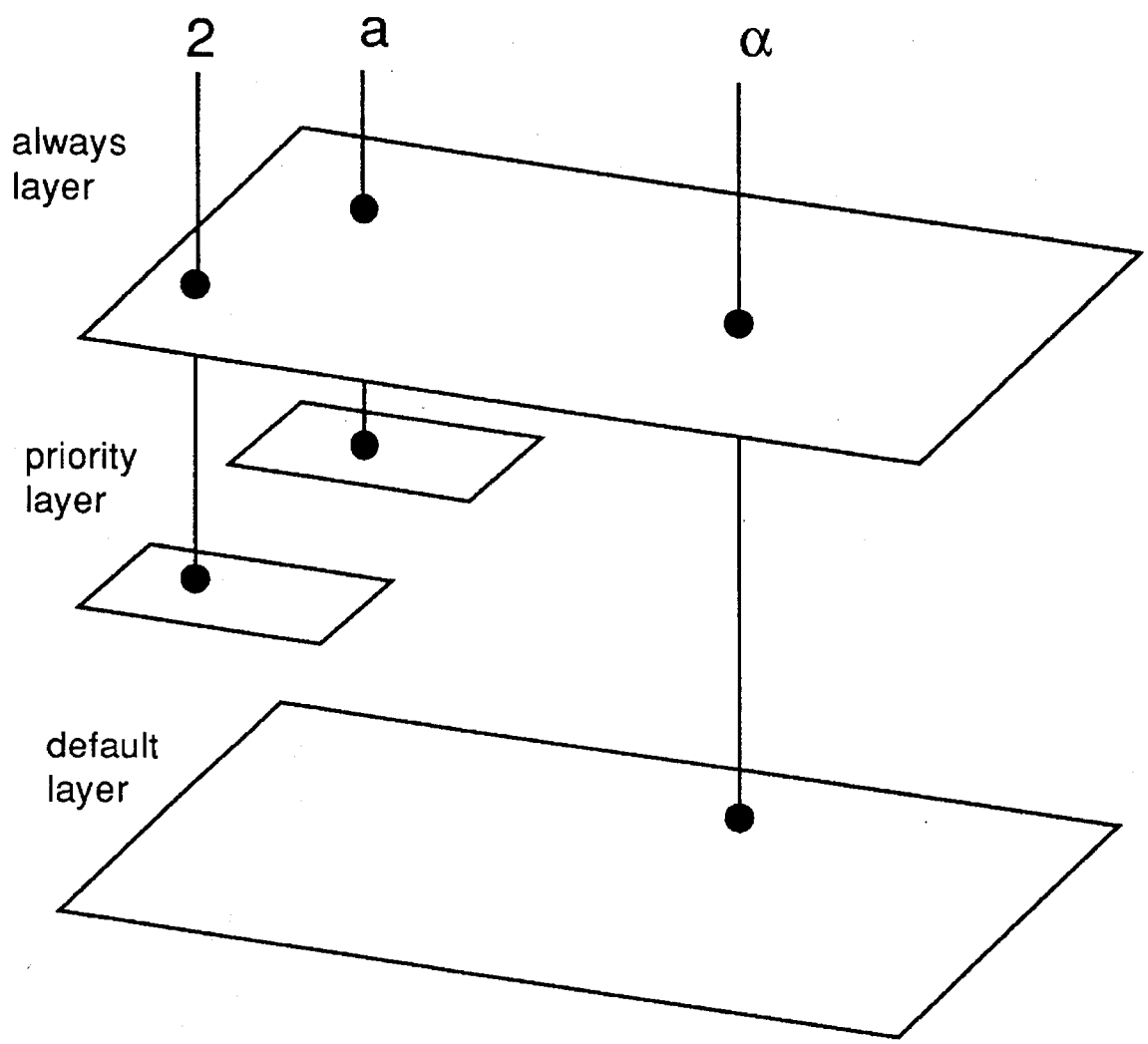
FIG. 5 is a diagram representing three layers of recognition into which inputs to the the display screen can be categorized, namely, an alwaysArea, a priorityArea, and a defaultArea.

With reference to FIG. 5, screen areas are divided into three types, corresponding to three screen "layers" in which the areas can lie: an alwaysArea layer, a priorityArea layer, and a defaultArea layer. When a new stroke comes in, recognition is first performed for all areas in the alwaysArea layer that intersect the stroke. Next, recognition is performed for all areas in the priorityArea layer that intersect the stroke. If the stroke does not intersect any of the priority areas, then it "falls through" to the default Area layer, and recognition is performed for all areas in the default layer that intersect the stroke. In this manner, it is possible to have respective recognition areas that are "observers" (i.e. record all strokes that are written in a specific area), to have areas that are "active" (like a check-box or a field), and to have areas that are in the background (like a piece of paper).

Handler Routine

When the controller has decided that an object has been recognized, it calls the handler routine that was specified for that type of object in the area hit by the object. The display routine is called with the recognized unit and an index to what the controller thinks is the best interpretation of the unit (if there are no interpretations, the index is passed back and set to −1). The display routine takes whatever action needs to be taken, then the display routine calls ClaimUnits on the unit to tell the controller that it has accepted the unit and is done with it. The controller then disposes of the unit and all its subunits at an opportune time.

If the screen area was registered to recognize multiple unit types, the Handler routines are called in a sequence that depends on the complexity of the recognized units, as well as on the order in which the types were added to the area. For example, if it is desired that an area recognize scrubs (stroke->edg->scrub) and words (stroke->part->char->word), then a scrub will always be classified before a word (three recognition steps versus four). Hence, the display routine for the scrub will be called first. If it is desired that an area recognize both scrubs (stroke->edge->scrub) and characters (stroke->part->char), then both a scrub and a character will be classified at the same time (because they are of the same complexity). The display routine belonging to the unit type that was added first to the area is called.

For screen areas that handle multiple unit types, the first Display routine that is called has the choice of whether or not to call ClaimUnits. For example, if the display routine for a scrub gesture is called, but the scrub doesn't cover any objects that can be deleted, then ClaimUnits shouldn't be called by the display routine. This leaves the unit unclaimed so that subsequent Display routines can be called on the same unit. This mechanism allows some convenient cases of simultaneous recognition to be handled.

There are two separate interfaces to the subsystem of the controller that handles areas. The first of these is designed to be used by toolboxes that maintain their own view systems, and which wish to control recognition through the view hierarchy. The second interface is designed for test programs that don't have view systems to do all this work for them.

To support the second interface, the controller has its own internally maintained lists of areas and methods to call when using those lists. If a toolbox is using the first interface, it can simply ignore these lists and methods.

The fundamental difference between these two interfaces is that the first one is for toolboxes that want to store, manipulate, and hit-test their own areas (and therefore don't need the controller to do it for them). The second one is for environments that have no such area maintenance facilities. In the sections below, reference is made to applications that use these two techniques as Own Areas applications and Default Areas applications, respectively.

Controller Methods and Other Routines

There are several controller methods that are also useful.

void TController::BuildGTypes(TRecArea *newArea);

void TRecBuildTypes(ULong recArea);

Once the application has finished initializing a TRecArea, then it needs to ask the Controller to build the full cached list of recognizers to call. It does this by calling BuildGTypes. If at a later time the application decides to add more types to an area, it can do so, provided that it calls BuildGTypes after adding the new types. A type is deleted by deleting the area and rebuilding the type list.

void TController::DefaultRegisterArea(TRecArea *newArea);

A Default Areas application must call this method after it calls BuildGTypes. This allows the Controller to save a copy of the area into one of its internal lists. An Own Areas application shouldn't call this. Instead it should store a reference to the TRecArea into the appropriate view or equivalent.

void TController::RemoveArea(TRecArea *newArea);

A Default Areas application should call this when it is done with an area, for instance, if it is hiding the area, or deactivating it, or simply getting rid of it. This does not dispose of the TRecArea, it simply removes it from the Controller's internal lists. The application should also remember to dispose of the TRecArea's area structure and of the TRecArea itself. An Own Areas application will not need to call this method.

To Be Implemented by the Application flag GetAreasHit(TUnit *unit, TArray *areaList);
, where flag is a user-defined data type When a new unit arrives into the recognition system, the Controller calls the routine GetAreasHit, which should be implemented by the application. The function of this routine is to determine which of the recognition areas intersect the unit. A Default Areas application can simply call back to:

flag TController::DefaultGetAreasHit(TUnit *unit, TArray *areaList);

and the Controller will handle all hit-testing on its internally maintained list of areas.

An Own Areas application should perform the hit test and then add one TRecArea to the areaList for each area that is hit. The bounding rectangle for the unit can be determined using an existing interface (unit->GetBBox(&r), or GetUnitBBox(unit, &r)). It can add a new TRecArea to an areaList by calling:

void TRecListAdd(ULong areaList, ULong area);

When this routine is called, the areaList should be the one passed to GetAreasHit, and the area must be a pointer to a TRecArea object.

It is worth noting that the unitList built by the application's GetAreasHit will be slightly modified by the Controller. Before the Controller uses the areaList, it scans through the areaList and builds a single TRecArea that represents the union of all the others. This element is stored as the last element in the areaList, and it is flagged by setting the area field of that element to point back to the areaList itself. If, for any reason the application should want to parse the areaList, it should check to see if the last element is flagged, for example, and skip it if it is.

Both the atypes and gtypes lists are of class TTypeAssoc, whose elements are Assoc structs. In an atypes list, each element stores one of the unit types that is desired within the area, the domain to call to do arbitration when a unit of that type is recognized. In a gtypes list, each element stores the unit type that is desired, and the application routine to call when an object of that type is recognized. In addition, each element stores a field called domainInfo, which contains domain specific information that can be used to cause the domain to behave differently from one area to the next. In this manner, one area can be used to do recognition, while another can be used to perform training. Similarly, if one area requires a certain amount of delay, while another desires none, then this too can be specified in the domain specific information.

Recognizers

A recognizer is a subclass of TDomain. For example:

```
class TWordDomain : public TDomain {
    public:
        // recognizer globals
    public:
        static  TWordDomain Make(TController *controller);
        void IWordDomain(TController *controller);
        void Dispose(void);
        void Classify(TUnit *unit);
        flag Group(TUnit *unit, dInfoRec *domainInfo);
    private:
        void StartWord(TStrokeUnit *line, TArray *areaList);
        flag AddToWord( TStrokeUnit *line, TArray
        *areaList);
};
```

The Make method creates the domain; currently a call to each domain's Make method is performed in main(). The Make method creates an instance of the TWordDomain class and then calls the Initialize method, IWordDomain, which initializes fields of the domain, specifies what kind of units it wants as input, and registers the domain.

Assume that there is a domain TCharDomain that wants to group TStrokeUnits into a TCharUnit. First of all, the domain should have its delay field set to a non-zero value. When the Group method calls AddSub to add the input unit to the output unit, the group's time field is set to the current time plus the domain's delay. This instructs the controller not to call TCharDomain to perform classification on the TCharUnit until that time has been reached. When subsequent TStrokeUnits arrive, TCharDomain can get a list of all partial characters by calling GetDelayList(charUnitType). It can then see if the new stroke should be added to any of those partial characters.

If the Group method can determine that a partial character is no longer eligible for further grouping, it should call the method EndSubs() on the partial. For instance, you might want to call EndSubs on all partial characters that are not hit by an incoming stroke. After EndSubs has been called, Classify will be called immediately on that group. If a new stroke causes some partial group to become invalid for some reason (too many strokes, stroke too big), you can call Invalidate() on the unit and it will never be classified or returned as a partial again.

Make Method

The Make method does a New and calls the initialize method.

A sample Make method:

```
TCWordDomain TCWordDomain::Make(TController
*controller)
{
    TCWordDomain *result;
    result = new TCWordDomain;
    result->ICWordDomain(controller);
    return(result);
}
```

Initialize Method

This method specifies the unit types the domain desires as input, by calling AddPieceType; initializes domain fields, such as specifying a timeout; and calls the controller routine RegisterDomain to register the domain.

A sample Initialize method:

```
void TCWordDomain::ICWordDomain(TController *controller)
{
    INHERITED::IDomain(controller, cWordUnitID, "CWord
Domain");
    // initialize recognizer-specific fields here
    // InitializeRecognizerHere(  );
    AddPieceType(strokeUnitID);
    this->fDelay = timeout; // specify delay for timeout
    controller->RegisterDomain(this); // register with
    controller
}
```

Group Method

When the controller gets a new unit, it calls the Group method of each domain that is interested in units of that type. In the trivial case, the Group method would create a new unit of the output type of that domain, assign the input unit as a subobject of the output unit, and then call the controller method NewGroup to inform it that a new group has been formed. In a less trivial case the Group method might add the new unit to an existing group.

```
flag TCWordDomain::Group(TUnit *piece, dInfoRec
*domainInfo)
{
    TArray        *areaList;
    areaList = piece→GetAreas( );
    if (!AddToCWord((TStrokeUnit *)piece, areaList))
        StartCWord((TStrokeUnit *)piece, areaList);
    return(true);
}
void TCWordDomain::StartCWord(TStrokeUnit *sUnit, TArray
*areaList)
{
    TCWordUnit    *wUnit;
    ULong         nPts;
    TStroke       *stroke;
    stroke = sUnit→fStroke;
    nPts = stroke→Size( ); // get number of points
    wUnit = TCWordUnit::Make(this, areaList,
        nPts); // make new unit
    CopyStrokeToBuffers(stroke, wUnit, 0);
    wUnit→AddSub(sUnit);
    this→fController→NewGroup(wUnit);
}
flag TCWordDomain::AddToCWord(TStrokeUnit *sUnit, TArray
*areaList)
{
    flag       goodHit;
    TUnitList  *partials;
    TCWordUnit *wUnit;
    ULong      i, index, nPts;
    TStroke    *stroke;
    rectangle  r, r1, r2;
    goodHit = false; // assume failure
    partials = this→fController→GetDelayList(this,
    fUnitType);
        // get partials
    sUnit→GetBBox(&r1);
    stroke = sUnit→fStroke;
    nPts = stroke→Size( ); // get number of points
    for (i = 0; i < partials→Size( ); i++) { // for each
    partial hit
        wUnit = (TCWordUnit *) partials→GetUnit(i);
        wUnit→GetBBox(&r2);
        InsetRectangle(&r2, -fix(12), -fix(12));
        if (SectRectangle(&r, &r1, &r2)) {
            index = wUnit→ExtendPointBuffers(nPts);
            // make room for new points
            CopyStrokeToBuffers(stroke, wUnit, index);
            wUnit→AddSub( sUnit );
            goodHit = true;
        }
        else {
            wUnit→EndSubs( ); // word not hit, signal done
        }
    }
    partials→Dispose( );
    return(goodHit);
}
void CopyStrokeToBuffers(TStroke *stroke, TCWordUnit
*wUnit, ULong index)
{
    TabPt       *tpt;
    coordType   *x, *y;
    flagType    *f;
    ULong       i, nPts;
    BUFPOINT    *pts;
    nPts = stroke→Size( ); // get number of points
    tpt = stroke→GetPoint(0);
    pts = *(wUnit→fBufPts) + index;
    for (i = 0; i < nPts; i++, pts++, tpt++) {
        pts→fx = (float) FixedRound(FixedMul(tpt→pt.x,
0x0004BAA1));
        pts→fy = (float) FixedRound(FixedMul(tpt→pt.y,
0x000642C8));
        pts→fpenState = 1;
    }
    --pts;
    pts→fpenState = 0;
}
```

Classify Method

The controller maintains a list of unclassified units. It looks at the delay field specified by the domain to determine how long it should wait before calling the Classify method on each group. If delay is set to 0 (the default), then Classify is called immediately. Otherwise it waits (delay/60 seconds) before calling Classify. The delay is measured from the last time a subobject was added to the group (using AddSub).

The Classify method should attempt to classify the collection of units that have been grouped together, and then store the interpretation(s) in the unit, as described below. Once classification has been successfully performed (including the null classification), and all the interpretations (if any) have been stored, the Classify method should call the controller method NewClassification. This will make the newly classified unit available as input to the next level of recognizers.

```
void TCWordDomain::Classify(TUnit *unit)
{
    TCWordUnit     *wUnit;
    StdWordInterp  *interp;
    ULong          i, index, length;
    char           answer[40];
    wUnit = (TCWordUnit *) unit;
// Recognizer specific information can be put into unit here
// RecognizerClassify( );
// for each interpretation returned, fill out an interpretation
record
    for (i=0; i<1; i++) {
// CopyCString(answer, recognizer.result); // get word
        CopyCString(answer, "word");
        AddCChar(answer, '0', wUnit→SubCount( ));
        AddCChar(answer, ' '); // add a space
    // Fill out the interpretation record for the top
interpretations
        index = wUnit→AddWordInterpretation( );
        wUnit→SetWordString( index, answer );
        interp = (StdWordInterp *)
        wUnit→GetInterpretation(index);
        interp→label = 0;
        interp→score = 0; // put appropriate score here
        interp→angle = 0;
    }
    this→fController→NewClassification(unit);
}
```

Recognition Units

The TUnit class and its subclasses are the fundamental unit of information that is handled by the controller. TUnit is the basic unit. It contains the minimal information necessary for the controller to dispatch it to the appropriate recognizers. Only events such as strokes, clicks, or keystrokes are stored as TUnits. TSIUnits are subclassed from TUnits, and they have subobjects and interpretations. Any domain that groups and classifies units should store the input units as subobjects of the output unit. Units are added as subobjects using the method AddSub.

When a domain's Classify routine is called, it should place a list of possible interpretations into the unit being classified (if it is a TSIUnit).

TSIUnit Flags

The fFlags field in objects of class TUnit is used primarily to send information to the controller about the status of that unit. For instance, after a TUnit has been claimed, the claimedUnit flag is set on that unit, all its subunits, and all units that use any of those subunits. This is a signal to the controller that the unit should be disposed the next time its Cleanup method is called.

Here is a list of the flags that are supported by class TUnit, and for each a summary of its usage.

```
#define   constantUnit      0x80000000  // set for
                                        "permanent" units
#define   claimedUnit       0x40000000  // set for "claimed"
                                        units
#define   partialUnit       0x20000000  // set for "partial"
                                        groups
#define   delayUnit         0x10000000  // set for "delay"
                                        groups
#define   invalidUnit       0x08000000  // set for "invalid"
                                        groups
#define   busyUnit          0x04000000  // set for "busy" units
#define   tryHarderUnit     0x02000000  // set to indicate "last
                                        chance"
#define   noTryHarderUnit   0x01000000  // don't ever try
(or                                                    claim)
```

A constantUnit is a unit that should never go away and serve the function of globals. For example, for doing double-click detection, a constant unit simply remembers the position of the last click. The important feature of constant units is that they cannot be claimed and they will not ever be disposed.

A claimedUnit is a unit that has been marked for disposal. When an application calls the controller method ClaimUnits(unit), then the claimedUnit flag is set for that unit, for all of its subunits, and for all other units that claimed units as their subunits. When the controller's Cleanup method is called it gracefully disposes of all these obsolete units. The reason for doing disposal via a flag is that when the controller calls out to an application with a recognized unit, it cannot tolerate this unit being disposed, since that would disrupt its internal state. When Cleanup is called, the controller knows that it is in an internally consistent state, and that nobody is relying on the integrity of the PiecePool or UnitPool. An application should only cause this flag to be set by calling the controller's ClaimUnits method.

A partialUnit is a unit that is known not to be complete. For instance, a character unit might be known to be the first two strokes of an 'E'. In this case it should be marked as a partial unit so that it doesn't get passed on to any domain that is looking for completed units. In any domain that doesn't have an explicit delay before classification is called, this flags serves as an indication that the unit is not ready to be classified yet. This flag will only be used by a recognizer that wishes to delay classification of a unit that has been created by Group() and put into the UnitPool using NewGroup().

A delayUnit is a unit that should not be classified until a specific amount of time has elapsed. This flag is maintained automatically by the controller and subclasses of TSIUnit, if the domain has requested a delay before recognition occurs. The flag is first set when the unit is placed in the unit pool (via NewGroup()), and at the same time the fTime field in the unit is set to the time after which classification should occur. Each time a new subunit is added to the unit (via AddSub()), the time field is updated to reflect the current time plus the specified delay.

A unit in the unit pool will not be classified until its partial flag is clear and the specified delay for the unit has expired. When EndSubs() is called on a unit, the fTime field is automatically updated so that classification occurs immediately. This flag is maintained automatically and should never need to be set by an application or a recognizer.

A invalidUnit is a unit that has been marked as invalid for some reason. A unit might be marked invalid by a domain when it is investigating which of its subunits should be legitimately considered as parts of the unit. A recognizer can invalidate a unit by calling the TUnit method Invalidate(). Because units do not own their subunits and might share them with other units, the use of this flag is somewhat dangerous. Technically, a unit should only be invalidated by the domain that created it like a partial character that doesn't get enough strokes added to it.

A busyUnit is a unit that should not be disposed for one reason or another. In Cleanup, the controller will not dispose a unit if its busy flag is set, even if it has been claimed.

The tryHarderUnit flag is set by the controller before it passes a unit back to the application for a second time. This might be useful if, for example, the controller passes back a graphic to the application, but the application doesn't have enough context to accept the graphic, or to claim it. If the controller tries to pass the unit back to the application with all possible interpretations, but none of them are accepted, then it might call back to the application a second time with the same unit, with this flag set, saying, in effect, try harder to use this unit. The case in which this is useful is to help distinguish between graphics and text. The application initially wouldn't accept a graphic if it was too small. If it did not accept the unit as text either, then the application would be called again to see if it wanted it as a graphic. This time it would probably accept it as a graphic. The noTryHarderUnit flag can be used to prevent the application from being called back a second timeand is used in training and replay applications.

CHARACTER SYMBOL RECOGNITION DOMAINS

The following documents the details of character recognition.

Character Prototype Libraries

The character prototype libraries are a place where all the information for trained characters is stored. This section describes the format of the character prototype libraries, but not necessarily how they are used in particular applications.

Character prototypes are stored in three separate libraries: CLib (character library) contains character descriptions and points to stroke descriptors; SLib (stroke library) contains stroke descriptors, and SCLib (stroke cluster library) points to stroke prototypes.

Character Library

The character library is a TDArray which contains an entry for each character prototype for which it has been trained. Each of these entries is intended to represent a collection of character shapes that all correspond to the same symbol written in a consistent style. There may be multiple entries representing the same symbol.

Character library entries have the following format (defined in TCharLib.h):

```
typedef struct {
    Unicode  c;         /* character code */
    Char     snum;      /* number of strokes */
    Char     variant;   /* number of variants */
    Char     position;  /* ascent/descent info */
    Short    samples;   /* # samples represented */
    Short    slIndex;   /* index to strokes */
} clEntry;
```

Unicode c

The character itself. This can be a unicode symbol. Alternately it could be an offset from a base unicode which can be stored in the library header.

Char snum

The number of strokes used by this character.

Char variant

The number of trained prototype variants. For instance, if there were 10 different 'a' prototypes trained, the variant fields of these entries would range from 0 to 9.

Char position contains ascent/descent information.

Short samples contains the number of samples of the character that are trained.

Short slIndex contains the index into the stroke library of the first stroke descriptor for this character. At present these indexes need not to be updated, but they might if trained prototypes were removed from the character library.

The Stroke Library

The stroke library is a TDArray which contains stroke descriptor entries. The number of entries in this library is equal to the sum of the snum field for all the entries in the character library. For example, a 't' prototype in the Clib has an slIndex field that points to entry 100 in the SLib. Since the snum field of 't' is 2 (two strokes), the stroke descriptors for that character prototype are stored in SLib entries 100 and 101. Each entry is used by one and only one clEntry (i.e. slEntries aren't shared), and each of them references one and only one stroke cluster. Note that multiple slEntries can refer to the same stroke cluster. The structure of an entry is as follows (defined in TStrokeLib.h):

```
typedef struct {
    Point   cmass;    /* saved center of mass */
    Short   scIndex;  /* index to stroke cluster */
    Short   flags;    /* special for DOTS */
    Short   angle;    /* rotation of stroke */
    Short   ratio;    /* ht/wd ratio of stroke */
} slEntry;
```

Point cmass contains a point that indicates the center of mass of the stroke relative to the character that contains it. All stroke matching is done relative to a fixed size box. cmass is the position, within the fixed box for the character, of the center of the stroke.

Short scIndex contains the index into the library of stroke clusters. Each slEntry points to one and only one stroke cluster.

Short flags are used to indicate special properties of the stroke. For instance, it might be used to indicate whether the stroke is a straight line or a dot.

Short angle contains the angle of the stroke within the character, assuming that the character is written in its normal upright position. In the slEntry the angle is stored as a short, but it is commonly used as a fixed point field.

Short ratio contains the height to width ratio for the stroke.

The Stroke Cluster Library

The stroke cluster library is a TChunkArray which contains stroke prototypes for matching. TChunkArrays are two-level lists in which each top level entry represents a cluster, and each cluster "contains" a number of stroke prototypes that belong to that cluster. Each cluster may be referenced by the scIndex field of one or more slEntries. This allows stroke sharing of common subcomponents of characters. For instance, typically there is only one cluster that represents a straight line segment. Every slEntry that corresponds to a straight line segment references this cluster. This produces two desirable effects: the stroke cluster library is smaller, and the matching score for similar characters (like '1', 'l', and 'I') will be identical because they all eventually match the same cluster. It produces a side effect: the symbol domain must be careful not to share clusters that aren't truly the same, otherwise a recognition error may occur. Each cluster in this library contains two entries: the number of elements in this cluster, and the index of the first element. Since this is the standard chunkEntry for class TChunkArray, it is not represented above. Within a cluster, the first element of the cluster is called the cluster representative. It is the average of all the other elements in the cluster (defined in TElasticLib.h)

```
#define  kProtoSamples 16    // # of samples in each Proto
#define  kBoxHeight 180L     // default size of proto box
typedef struct {   /* PROTO POINT */
    Short   x;      /* x coordinate */
    Short   y;      /* y coordinate */
    Short   extra;  /* padding */
    Short   slp;    /* slope at this point */
} ProtoPoint;
typedef struct {
    ProtoPoint        pts[kProtoSamples];
    long    samples;          /* number of samples */
    UShort  len;      /* length of elastic */
    UShort  curve;    /* curvature of elastic */
```

-continued

} Proto;

ProtoPoint pts

A number of samples taken from the original stroke. Before the stroke is sampled, it is processed in a number of ways. It is rotated to a standard alignment, it is normalized to fit into a standard sized box, it may have hooks removed, and it may be smoothed (not necessarily in that order). Each sample in the stroke is of type ProtoPoint, shown below.

Long Samples

The total number of samples represented by this prototype. Any single prototype is made by averaging together other prototypes. The samples field indicates how many prototypes were averaged to create it. The first prototype in a cluster is the average of all the other prototypes in the cluster. Its samples field is the sum of the samples fields of the rest of the prototypes in the cluster.

Fixed len

A measure of the total combined length of the points in the prototype, as if they were written as a stroke. This field is stored as a fixed-point number, which represents the number of times the stroke traverses the box used for normalization. The length of a straight line is about 1, the length of a 'v' is about 2, and the length of a 'w' about 4. This value is used for two purposes: the first is to eliminate prototypes that are too different for comparison; the second is to normalize the result: the matching score of a long complicated stroke tends to be larger than the matching score of a short simple stroke.

Long Curve

A random measure of the curvature of the stroke. Samples used in the prototype have the following format:

```
typedef struct {       /* PROTO POINT */
    Short   x;         /* x coordinate */
    Short   y;         /* y coordinate */
    Short   extra;     /* padding */
    Short   slp;       /* slope at this point */
} ProtoPoint;
```

Short x

The x position of the sample within the normalized box.

Short y

The y position of the sample within the normalized box.

Short slp

The angle of a tangent to the stroke at the given x, y coordinate. The slope is represented as an integer angle between −179 and 180. The tangent at a given point is calculated as being halfway between the angle from the previous point to the current point, and the angle from the current point to the next point.

The angle between two points a measure of the direction from a first point to a second point. If you put the first point in the middle of a circle, and let the circle itself represent the possible positions of the second point, then 0° is at the top of the circle, 90° is to the right, 180° (and −179°) at the bottom, and −90° to the left. So, for instance, the sequence of tangents in 'e' might be 90, 90, 90, 90, 45, 0, −30, −60, −90, −120, −150, 180, 160, 140, 120, 100. This sequence assumes that there is no rotation of the stroke prior to sampling.

ELChars

There is one additional structure that is critical for tying together the structures described above: ELChars, which is stored in the TSymPartDomain. This structure provides a mapping from matched entries in the Stroke Cluster Library to matched entries in the Character Library. For each unique stroke shape that is stored in the Stroke Cluster Library, there is one entry in ELChars, which lists all of the symbols that can contain that matched stroke.

ELChars, like the Stroke Cluster Library, is a TChunkArray. Each cluster corresponds to a cluster in the Stroke Cluster Library. Each cluster contains a number of entries, one for each symbol that can contain the stroke. The data in each entry is a partially used partMatch record (defined in TSymPartUnit.h):

```
typedef struct {
    Char    sym;        // the symbol used by this stroke
    Char    part;       // the stroke within the symbol
    Char    totParts;   // total strokes in the symbol
    Char    dummy;      // UNUSED
    Short   clIndex;    // index to the matched character
    Short   size;       // UNUSED
    Short   angle;      // UNUSED
    Short   base;       // UNUSED
    Short   fit;        // set to 0
    Short   flags;      // UNUSED
} partMatch;
```

ELChars is built entirely from the structures described above; it contains no new or additional information. It is simply used to make recognition faster. It is built once when the default libraries are read in, and it is updated as new characters are trained.

DESCRIPTIONS OF FLOW CHARTS

Figure 6:
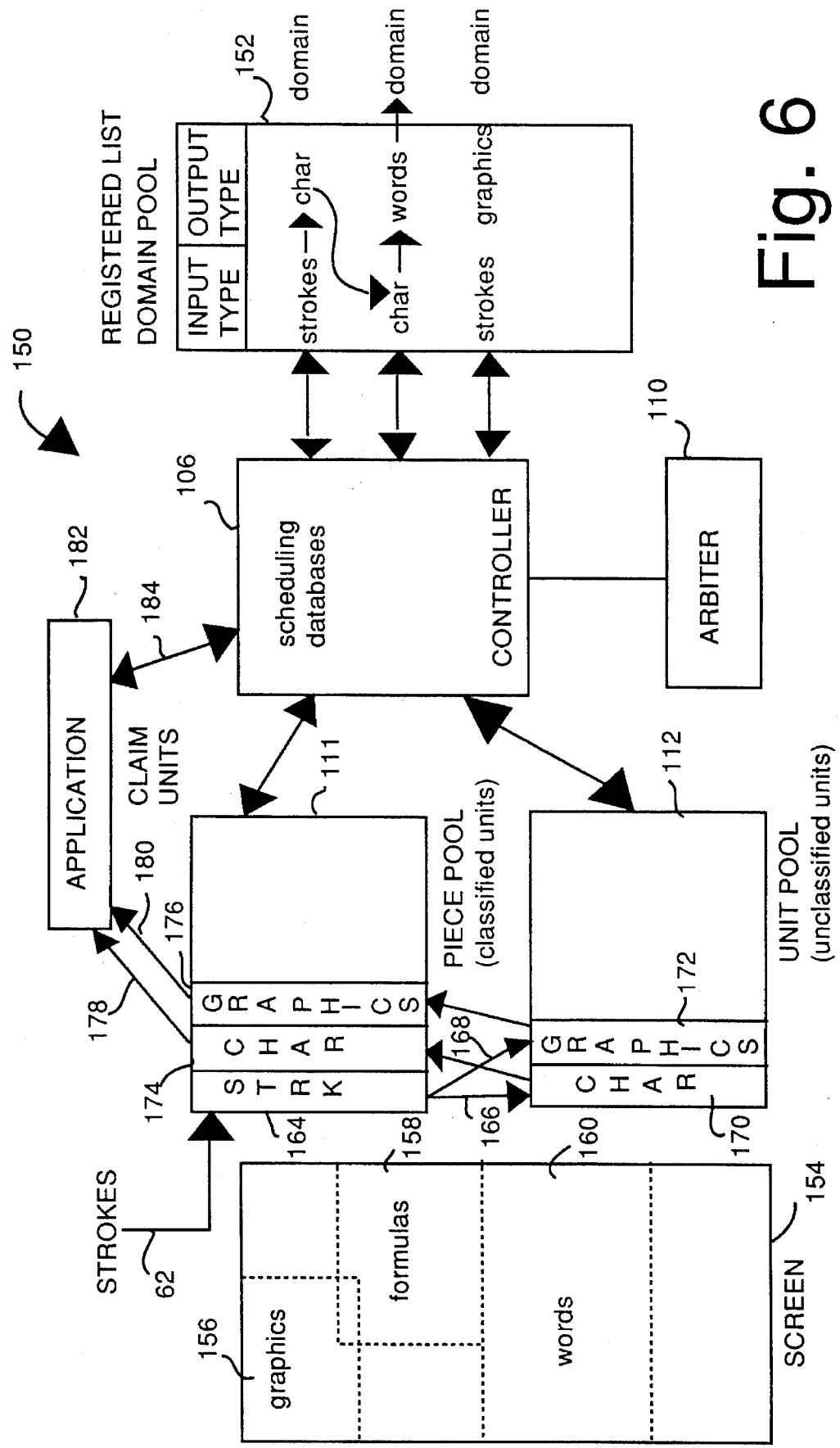
FIG. 6 is a diagram illustrating the flow of information in a system according to the invention.

FIG. 6 illustrates the flow of information and commands in a system 150 according to the invention. A domain list 152 contains those recognition domains (objects) which are registered by the controller 106. The domain pool 100 receives information about the input and output types for each domain from the controller 106. Examples of the input types and output types are shown for several domains. For a character recognition domain, TCharDomain, the stroke input has TStrokeUnit type and the character output has TCharUnit type. For a graphical object recognition domain, TGraphDomain, the stroke input has TStrokeUnit type and the graphical symbol output has TGraphUnit type. Each recognition domain contains the knowledge and methods required to recognize a particular object such as characters, words, and graphical symbols.

Recognition areas are specified by the application components with regard to what type of objects are to be expected in those areas. The controller maintains a list of these areas, and when an object of the specified type (a word, for instance) is recognized within an area, the controller passes the object back to the application component. A representation 154 of the display/input screen illustrates an example of certain areas of the screen being registered with the controller as having certain types of objects to be recognized in those areas. A graphics area 156 is designated as having graphical objects to be recognized. An area 158 is designated as having formula objects to be recognized. An area 160 is designated as having words to be recognized. The controller uses this information to process only the designated types for each area.

The memory arrays 104 contains a piece pool 111 and a unit pool 112. Input strokes are fed into the piece pool on an input path 162 and stored in the piece pool 111 in a STRK area 164. The stroke information is processed by an appropriate recognition domain and passed along a path 166 or a path 168 to either a CHAR unit 170 and/or a GRAPHICS unit 172 of the unit pool 112. The information is stored in the form of unclassified units in the unit pool. The recognition domains perform changes to the strokes (via the controller). These changes lead progressively to the recognition of the input. The pool mechanism eliminates the need for direct communication between domains while providing a uniform communication mechanism. The control unit 106 manages the process. It maintains communication with the recognition areas. It stores and retrieves hypotheses from the unit and piece pools and ensures their consistency. It hands the hypotheses to the appropriate domains for recognition. Information from the CHAR or GRAPHICS unit 170, 172 of the unit pool is processed by appropriate recognition domains and passed to CHAR 174 and GRAPHICS 176 of the piece pool as classified units.

A claimed unit is a unit that has been marked for disposal. The paths 178, 180 indicate information that is passed to an application. The application is designated182. When an application 182 calls the controller method ClaimUnits on a unit on a path 184, the claimedUnit flag is set for that unit, for all of its subunits, and for all other units that have claimed units as their subunits. When the controller's Cleanup method is called it gracefully disposes of all these claimed units. The reason for doing disposal via a flag is that when the controller calls out to an application with a recognized unit, it cannot tolerate this unit being disposed, since that would disrupt its internal state. When Cleanup is called, the controller knows that it is in an internally consistent state, and that nobody is relying on the integrity of the PiecePool or UnitPool.

The arbiter 110 coexists with the controller and resolves conflicts among competing hypotheses and also determines when the recognition process is completed for a given stroke or set of strokes. When recognition is completed, a hypothesis and all its related strokes are removed from the database 102, and a corresponding recognized object is emitted and returned to the application which has requested recognition.

Figure 7:
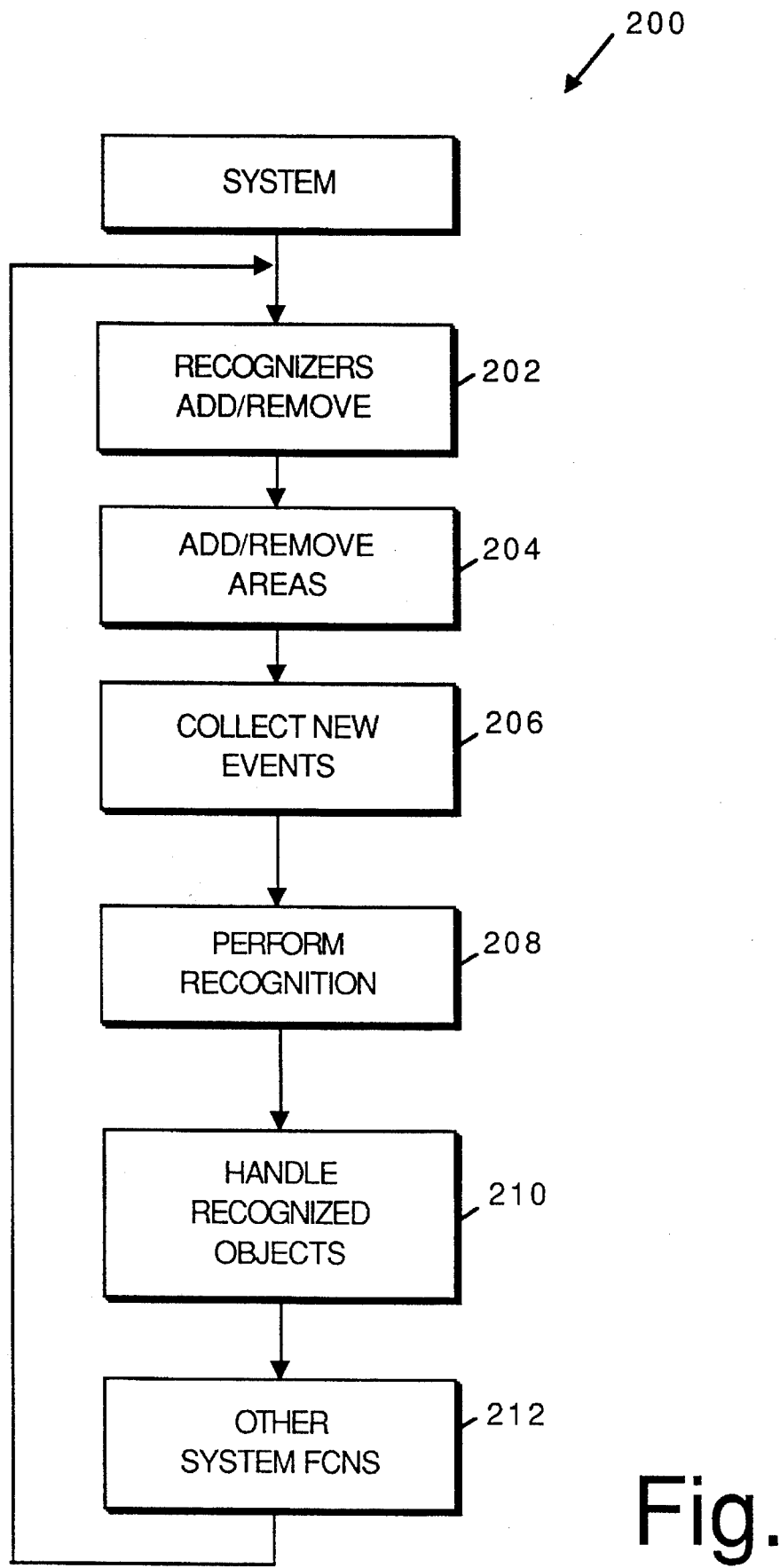
FIG. 7 is a flow chart illustrating the sequence of events associated with performing a recognition sequence.

FIG. 7 is a flow chart 200 illustrating an overall sequence of steps associated with performing recognition. This overall sequence is incorporated into an operating sequence of a computer system. In Step 202 the controller adds new recognition domains or deletes obsolete recognition domains as required by an application program. In Step 204 the controller adds or removes screen areas from its arealist. In step 206, a new event, such as a stroke, a key depression, or a voice input, enters the system, causing a new unit to be made and passed to the appropriate recognition domains. In Step 208, recognition of the units is performed using grouping, classification, and cleanup procedures. In Step 210, the application program looks at the results of the recognition process and determines whether those results can be used by the application. In Step 212, the computer system performs other system tasks, such as, for example, updating display windows and sending/receiving facsimile messages.

Figure 8:
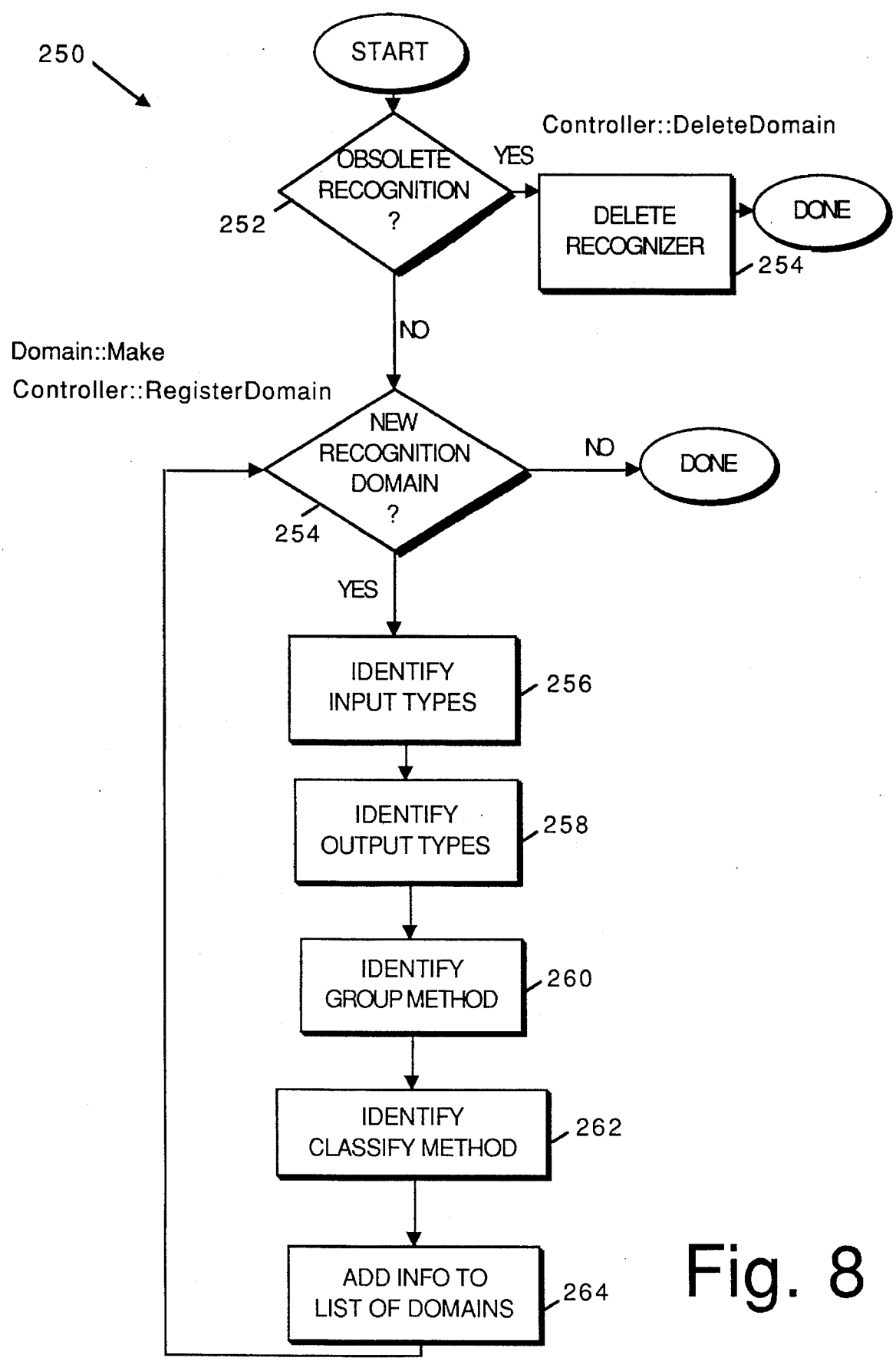
FIG. 8 is a flow chart illustrating a sequence of programmed steps for adding a recognizer domain.

FIG. 8 shows a flow chart 250 illustrating a sequence for the controller adding a recognizer domain to the list of recognition domains. A decision Step 252 determines whether the recognition domain is obsolete. If so, Step 254 calls an ADDRECOGNIZER routine to cancel the recognition domain from the controller's list of domains and to update the controller's screen arealist.

If the domain is not obsolete, a decision Step 254 determine whether the domain is new. If not, the routine ends. If the recognition domain is new, a method TDomain::Make is called for making a domain. A method TController::RegisterDomain is called for registering the domain in the controller's list.

For each new recognition domain, the folowing steps are taken:

Identify input types (step 256);

Identify output types (step 258);

Identify group method (step 260);

Identify classify method (step 262);

Add this information to the controller's list of domains (step 264); and

Repeat for each new recognition domain

If each domain has input types and output types, we see that the controller has enough information to build a recognition path. For example, to build a recognition path to recognize words, we must first recognize characters (chars) and to recognize chars, we must first get recognize strokes.

Figure 9:
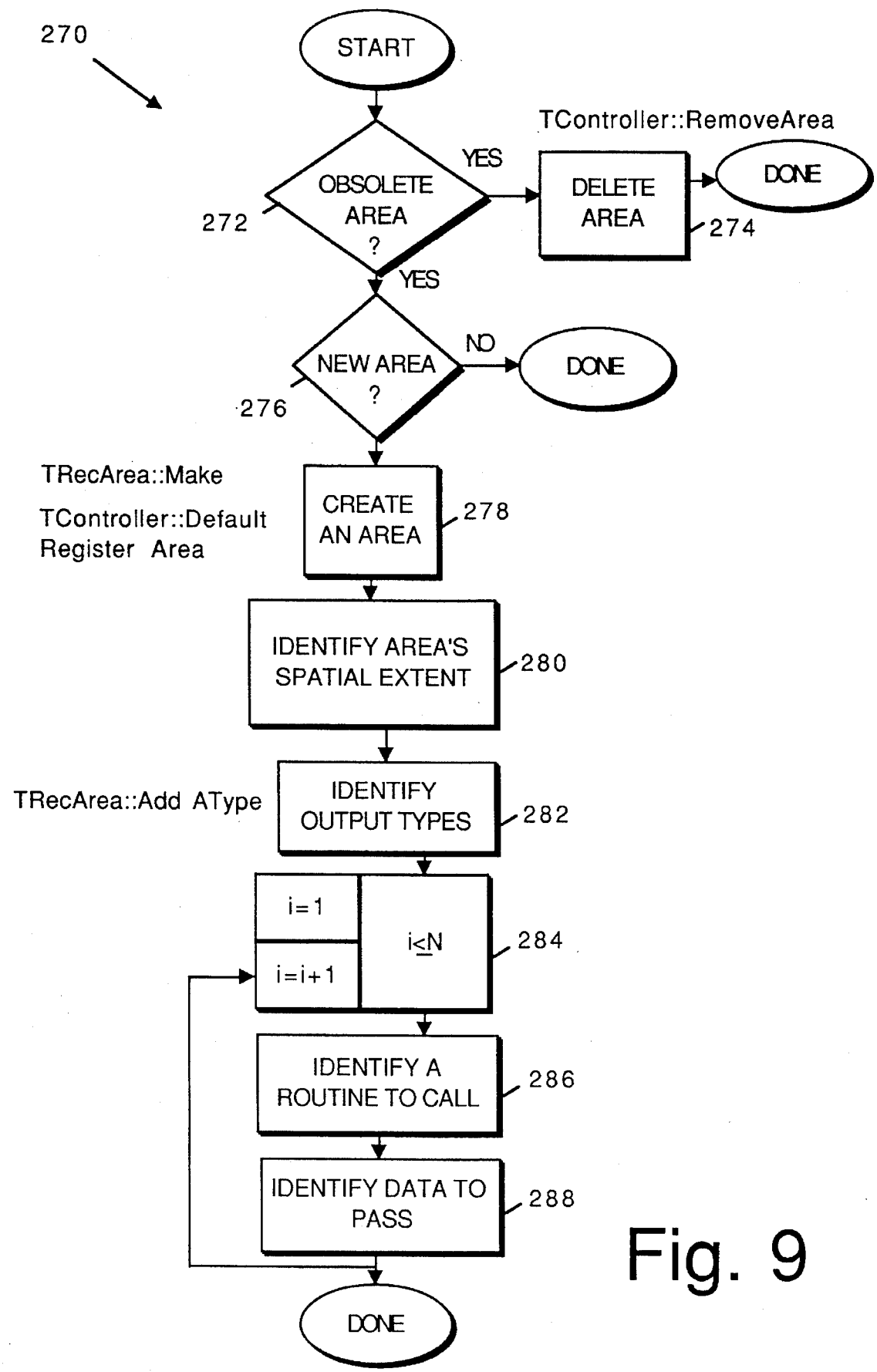
FIG. 9 is a flow chart illustrating a sequence of programmed steps for adding or deleting display screen areas.

FIG. 9 shows a flow chart 270 which illustrates a sequence of steps called by an application to add or delete display screen areas. A decision Step 272 determines whether the area is obsolete. If so, Step 274 calls a TContoller::RemoveArea method to delete the screen area from the controller's list and update the area references. A decision step 276 determines whether the area is new. If not, the routine is finished. If the area is new, the method continues using TRecArea::Make and TController::DefaultRegisterArea methods.

To identify a new area:

Create an area (step 278);

Identify spatial extent of the area (step 280);

For each output type (step 284):

identify a routine to call (step 286);

identify data types to pass in/out of the recognizer (step 288).

An area is created using TRecArea and Controller::DefaultRegisterArea. Data types are identified with TrecARea AddAType.

Here we see that if the application asks for one output type, say words, then this area, together with the controller's list of domains, contains complete routing instructions. For example, if a stroke is seen, a character recognizer is called to produce characters. If a character is seen, a word recognizer is called to produce words. If a word is seen, the application is called back.

If the application asks for multiple output types, such as words and dates, it is possible to share recognition effort. For example, if a stroke is seen, a character recognizer is called to produce characters. If a character is seen, the same word recognizer can be called to produce words. If a character is seen, a date recognizer is called to produce a date. If a word is seen, the application is called or, alternatively, if a date is seen, the application is also called. If both a word and a date are seen, the arbiter determines which hypothesis is best. The application is then called and it passes the best hypothesis.

Figure 10:
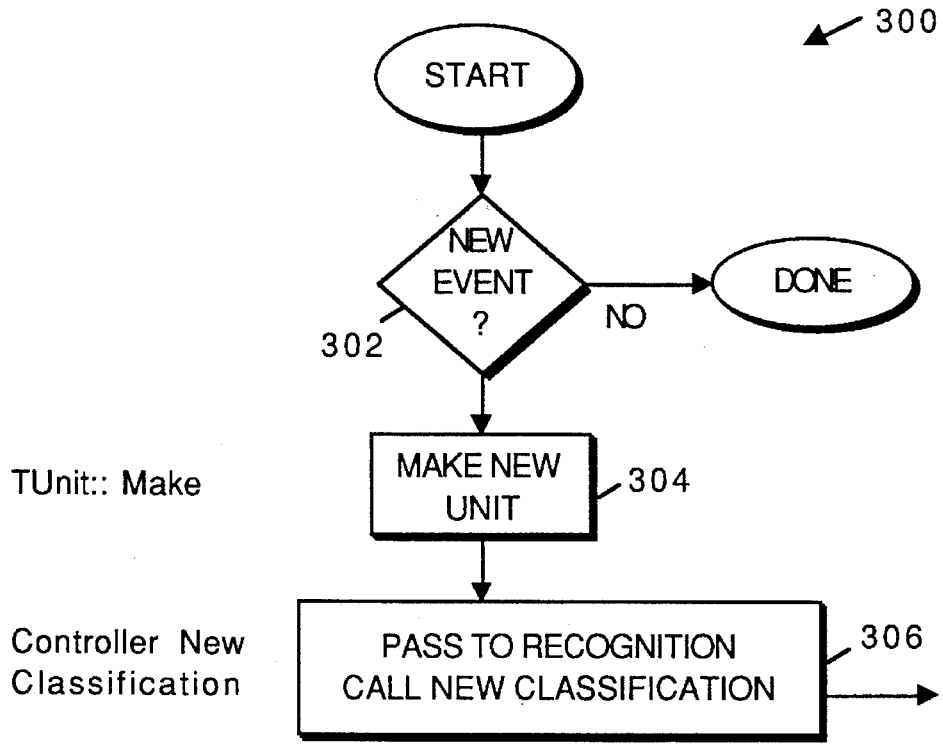
FIG. 10 is a flow chart illustrating a sequence of programmed steps for collecting new input events to the system.

FIG. 10 shows a simple flow chart 300 illustrating a sequence of programmed steps for collecting new input events to the system. A decision Step 302 determines whether an event is new. If so, Step 304 causes a new unit to be made using TUnit::Make. In Step 306, the new unit is passed to recognition by the controller using a method TController::NewClassification. Cleanup occurs when a unit is claimed by an application and the unit is deleted and removed from the unit list.

Figure 11:
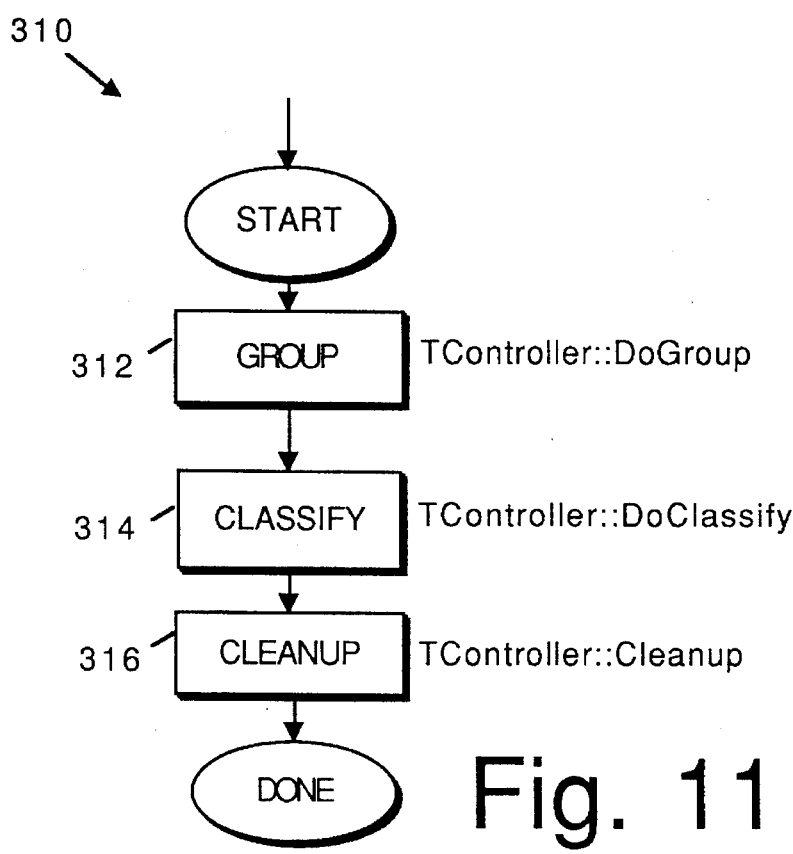
FIG. 11 is a flow chart illustrating a sequence of programmed steps for performing a recognition sequence.

FIG. 11 shows a flow chart 310 illustrating the steps for performing a recognition sequence on a unit. Step 312 performs a grouping operation using a method TController-::DoGroup. Step 314 performs a classification sequence using a method TController::DoClassify. The concepts of Grouping and Classification are described herein above. Step 318 performs a cleanup operation using TController-::Cleanup.

Figure 12:
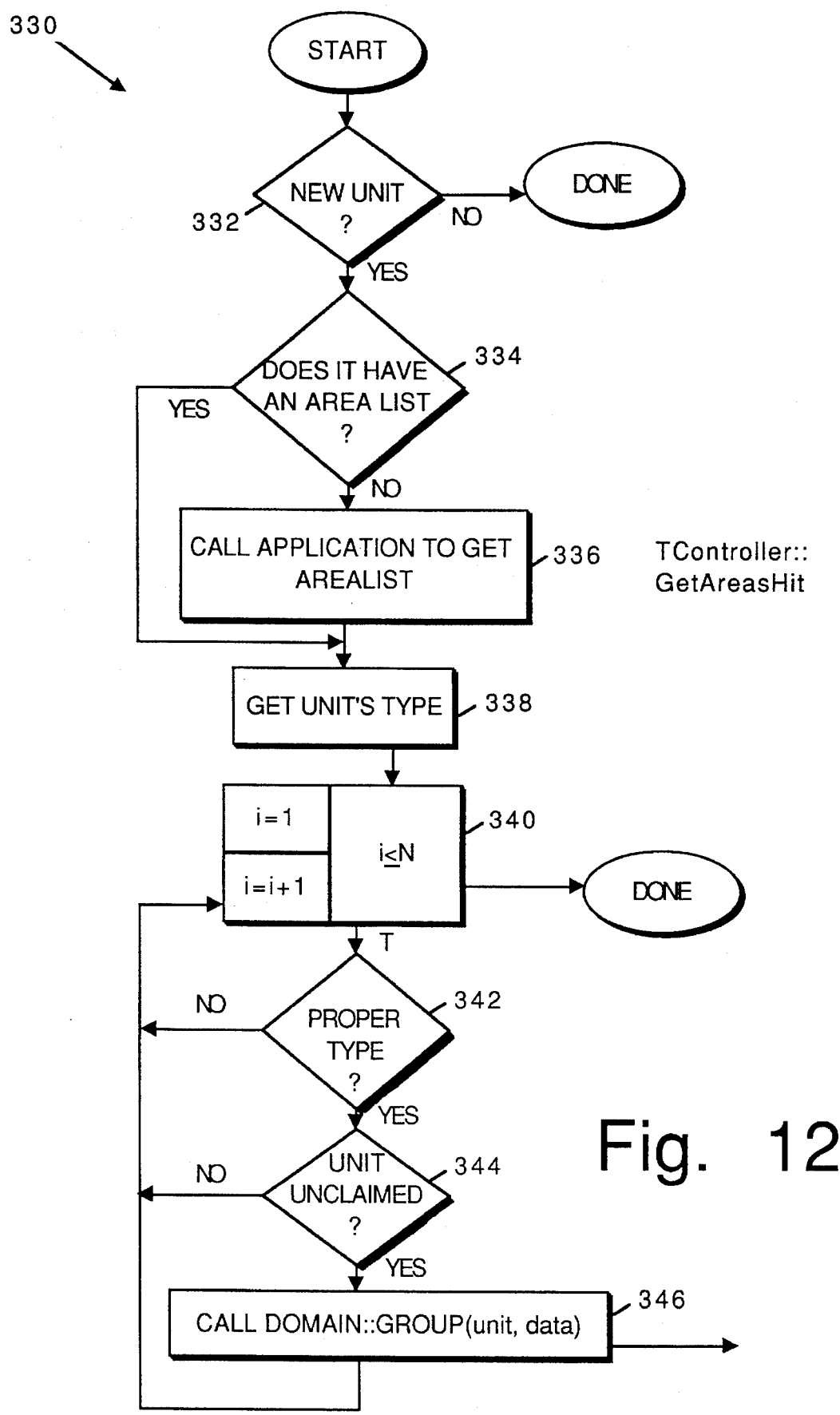
FIG. 12 is a flow chart illustrating a sequence of programmed steps for initiating a group operation.

FIG. 12 shows a flow chart illustrating a sequence of programmed steps for initiating a grouping operation. The following steps are taken:

Is there a new unit in the queue? (step 332);

Does it have an area list? (step 334);
    if no, call the application to get an arealist (step 336) using TController::GetAreasHit);
    get unit type (step 338)
    for each element in the area list (step 340):
        if element has proper input type (step 334), and if unit is not claimed (step 344), call Domain::Group (unit) method (step 346).

Figure 13:
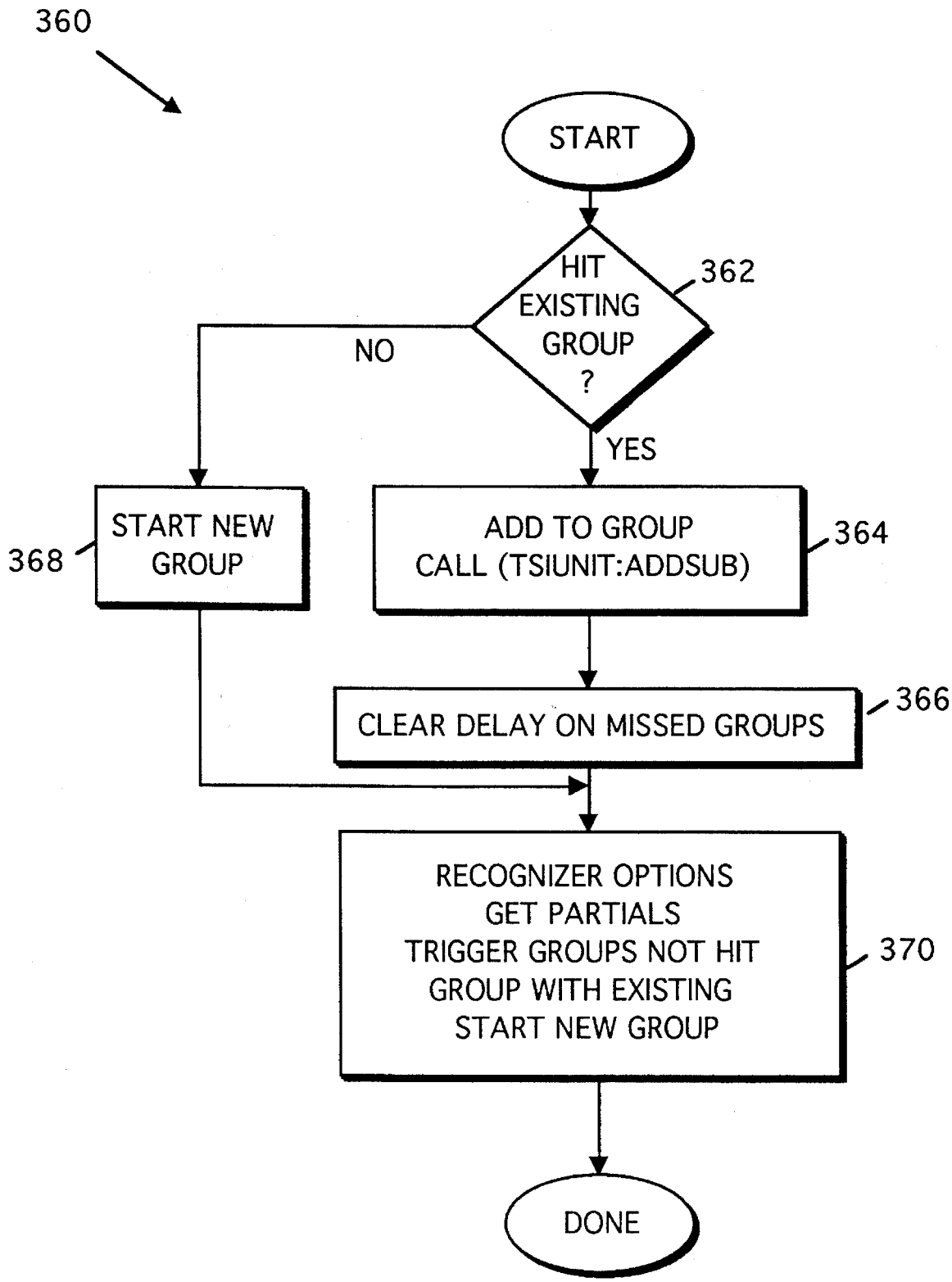
FIG. 13 is a flow chart illustrating a sequence of programmed steps for grouping one or more groups of related subhypotheses using domain grouping knowledge.

FIG. 13 shows a flow chart 360 illustrating some of the steps of the Domain::Group method for grouping one or more groups of related subhypotheses using domain grouping knowledge. A group is an unclassified unit in the piece pool.

Domain::Group:

Does the new element hit an existing group (step 362)?

If so, add it to the existing group (TSIUnit::AddSub) (step 364);

clear delay on missed groups (step 366);

Did it miss, or does the domain allow arbitrary overlap?,

If so, start new group (TUnit::Make) (step 368);

In summary, the recognizers can (Step 370):

get partials;

trigger groups not hit;

group with existing groups start a new group.

Figure 14:
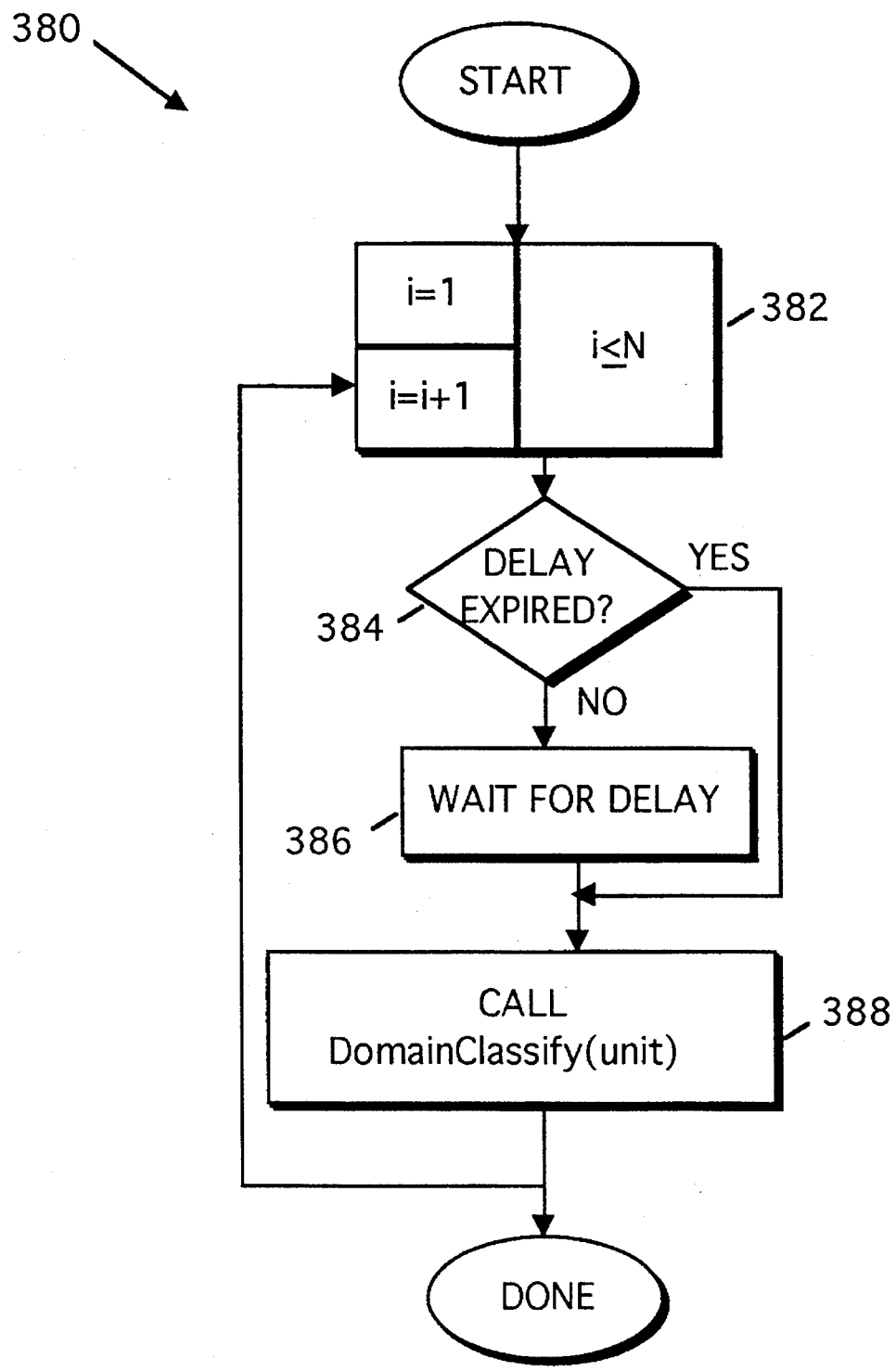
FIG. 14 is a flow chart illustrating a sequence of programmed steps for initiating a classify operation.

FIG. 14 shows a flow chart 380 illustrating steps for initiating a classify operation. Step 382 indicates a loop for each element in the group pool. Step 384 tests whether the delay time between grouping and classification has expired. If not, Step 386 indicates that the classification for that unit should wait for the delay time to expire. After the delay time has expired or if no delay time is required, Step 388 calls the Domain::Classify(unit) method. Standard output types are provided to the application in accordance with the application standards for particular types of units, for example, all applications might utilze standard word or graphical units.

Figure 15:
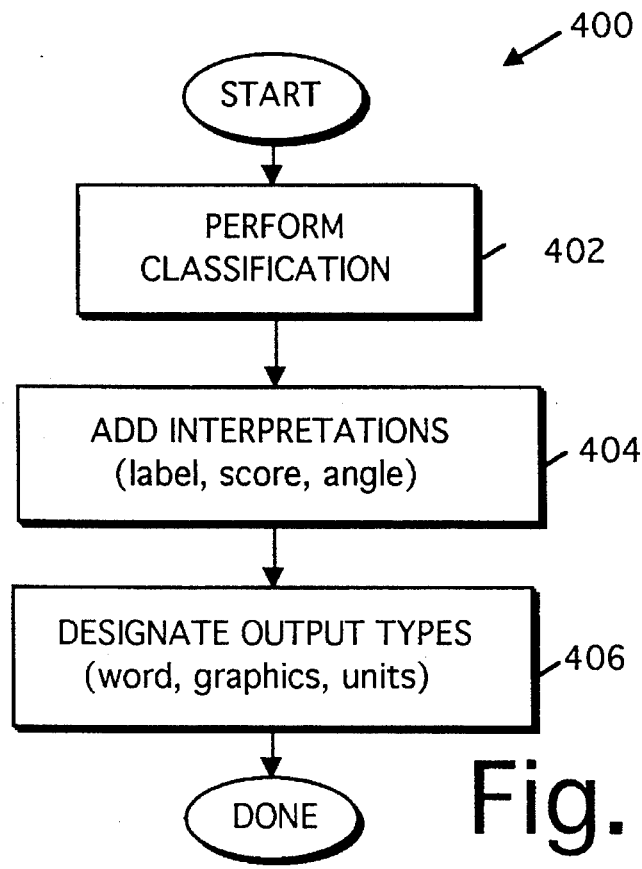
FIG. 15 is a flow chart illustrating a sequence of programmed steps for classifying.

FIG. 15 is a flow chart 400 illustrating a sequence of programmed steps for classifying a unit. A classification method is allowed to form new units, if appropriate or desired. The controller calls a classify method of the domain for a unit.

Figure 16:
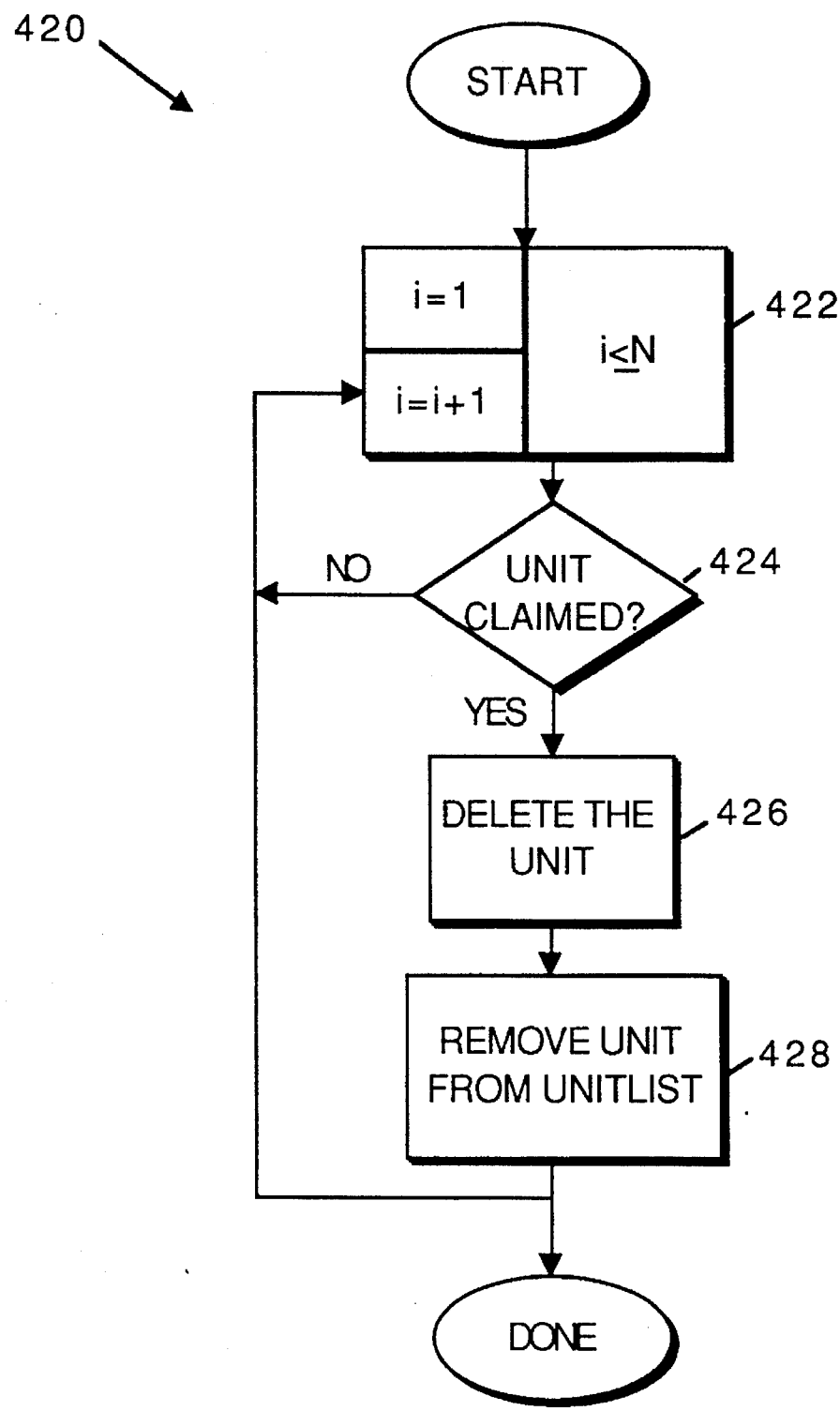
FIG. 16 is a flow chart illustrating a cleanup routine for a unit claimed by an application.

For each unit in the group pool,
    if unit doesn't need delay or delay has expired,
    Unit ->Domain->Classify
Domain::Classify:
    perform classification (step 402);
    add interpretations to units (step 404);
        label,
        score,
        angle;
    provide standard Output types (step 406):

FIG. 16 is a flow chart 420 showing a cleanup routine when a unit is claimed by an application. Step 422 indicates a loop for each unit from a classified group. Step 424 tests for whether a unit is claimed. If so, in Step 426 the controller deletes the unit and in Step 428 removes the unit from the unit list. This process is repeated for the piece pool and unit pool.

Figure 17:
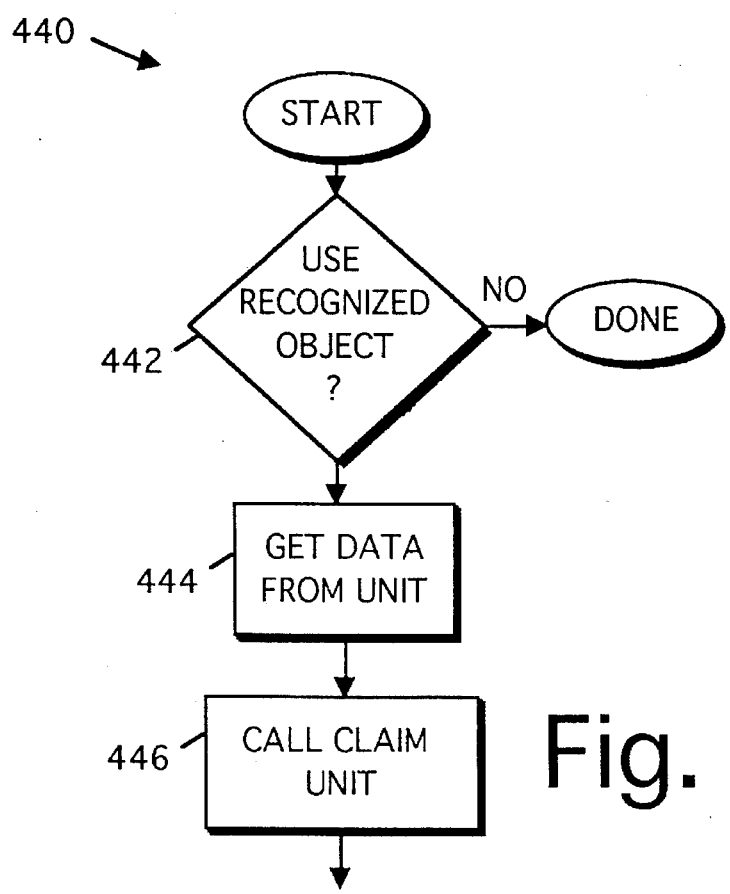
FIG. 17 is a flow chart illustrating a routine for an application handling a recognized object and for marking claimed units for deletion.

FIG. 17 is a flow chart 440 illustrating a routine for an application handling a recognized object and for marking claimed units for deletion by setting flags.

Step 442 determines whether the application wants to use a recognized object. If so, Step 444 shows the application getting appropriate data from the claimed unit. Step 446 shows the method ClaimUnits being called for marking all claimed units.

Figure 18:
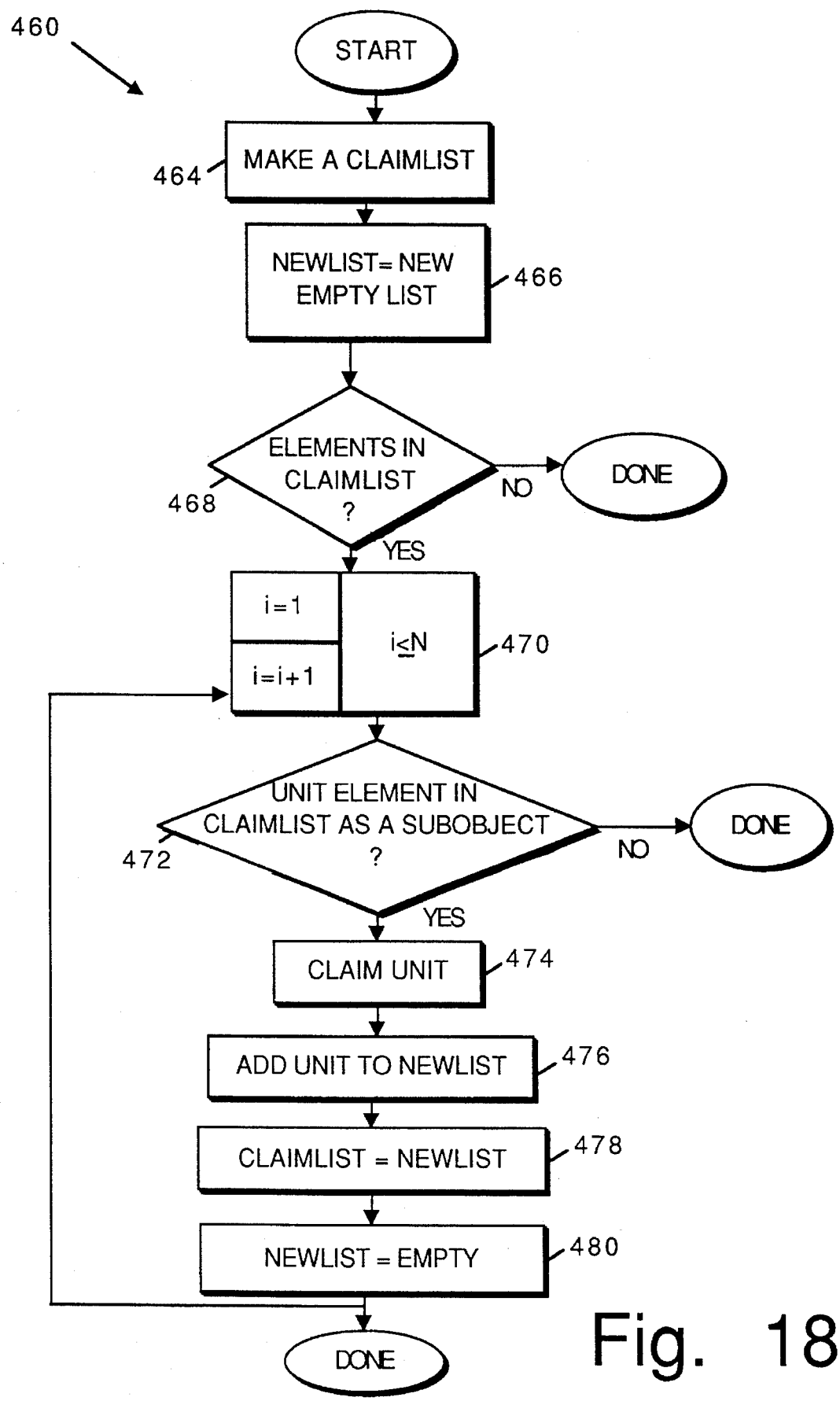
FIG. 18 is a flow chart for the ClaimUnits method, which is a recursive method called by an application to mark all claimed units for deletion.

FIG. 18 shows a flow chart 460 for the ClaimUnits method. This recursive method is called by the application to mark all claimed units for deletion.

ClaimUnits (unit):
    claimlist= list of root-level (without subunits) claimed units (step 464),
    newlist= new empty list (step 466);
    if there are elements in claimlist (step 468);
        for each unit in the unit pool (step 470),
            if unit has an element in claimlist as a subunit (step 472)
        claim the unit (step 474),
        add the unit to newlist (step 476);
    claimlist=newlist (step 478_,
    newlist=empty (step 480).

The same process is applied to the piece pool.

EXAMPLES OF RECOGNITION DOMAINS

Recognition domains are available for characters, words, numbers, gestures, symbols and punctuation, formulas, and simple shapes. These domains are useful with the recognition architecture provided according to the invention. In addition to these types of recognition domains, other types of recognition domains are provided for use with the recognition architecture of the invention to implement the various recognition techniques described herein below.

Symmetry

For graphical objects, there are two kinds of symmetry, axial and control. Axial symmetry deals with correspondence in the relative position of points in a figure on opposite sides of an axis. For example, a figure of a symmetrical flask has symmetry about a vertical axis through the center of the flask. Central symmetry deals with correspondence in the relative position of points in a figure about a center point. An example of this type of symmetry is a daisy having a number of symmetric petals radiating from a center point.

In order to test for axial symmetry, a two step process is required. In the first step, clusters of slopes and of lengths of line segments are formed using clustering techniques and used to generate hypothesis equations, or sets of constraints which govern the symmetry relationships between the line segments. These equations detect the potential symmetry and express regularity of the figure. The second step is to solve the equations.

Some techniques solve the equations for axial symmetry as an entire system rather than using prioritized constraints. We propose to solve the equations using a conjugate gradient for sparse linear systems. For intermediate cases where there are non-linear equations of specific types, the conjugate gradient method can also be used. The present invention advantageously solves a mixed system of linear and certain nonlinear equations.

In order to test for central symmetry in closed figures, we propose a three-step technique. In the first step, a sequence of local curvatures is generated. Next, a Fast Fourier Transform (FFT) is performed on that sequence. The coefficients of the FFT are examined, particularly at the low frequencies to determine whether there is a single, significant peak in the transform. If there is a peak, then the curvature of the figure is periodic and the figure is substantially centrally symmetric.

Erasing Partial Objects

This technique is concerned with editing several kinds of objects displayed on a screen including irregular curves, regular shapes such as circles, and simple polygons. A technique for doing partial erasing involves first establishing an underlying representation for what appears on the screen using an arrangement of points, or nodes to establish various constraints on the underlying representation. Line segments between the nearest points can be removed to give the illusion on the screen of partially erasing an object. Erasure of a portion of a graphical object can be accomplished by using, for example, a scrub gesture. For example, a portion of a circle or a simple polygon can be erased by establishing points at ninety degree intervals in a circle or at the corners of a regular polygon. For modification of an irregular curved line segment in an original, new points can be established at the intersection points of an old and a new line segment with the old line segment being erased between the new points. Blending of the new line segment with the remaining part of the original. For a closed curve, the underlying representation is done with tangents and the blending is accomplished by comparing tangents.

Concentric Alignment

A technique is provided for the alignment of the centers of two concentric circles or other regular geometric shapes, such as arcs, triangles. The technique involves writing the first shape. Next, the reconizer looks at the first shape to see if the centers of the first and the second shape are arbitrarily close. If so a uniquely identified center of symmetry is determined for concentricity.

Smart Alignment

This technique involves arranging later-drawn objects on a screen in a pattern deduced from earlier-drawn objects on the screen. A technique called on-line clustering uses several different factors which provide information about the objects and their relationships to each other. These factors include size of an object, distance between objects, alignment of objects along x and y axes, and angular orientation of the objects on the screen. In an on-line fashion, these factors are computed and updated for each new object as it enters the system to produce a pool of global values for these factors.

Values of these factors are clustered. When a new object is drawn, it is analyzed for these values. The next object is entered and the global values from the pool are used in a recognition domain to reconcile the new values with the global values. This provides a best estimate of how the new object might be aligned on the screen with respect to the other object or objects. An example of this technique is the drawing and arrangement of multiple square-shaped objects on a screen, for example, when the squares are approximately the same size and equally spaced. This so called smart alignment can use points of gravity, obvious axes, and the like.

Two-Dimensional Spatial Parsing

This technique involves using a recognition domain for parsing of formulas and the like. One such technique is described in a copending U.S. patent application invented by Giulia Pagallo entitled "Constrained Attribute Grammars for Syntactic Pattern Recognition" and assigned to the assignee of the present application. The copending patent application provides a method for defining and identifying valid patterns for use in a pattern recognition system which has subpatterns with multi-dimensional relationships, such as are found in mathematical functions.

Manipulating Screen Graphical Objects

A recogniton technique involves maintenance of a dual representation of, for example, a free-form object drawn on a screen. One representation is the free-form, unedited (unclean) representation on the screen. The other representation is a clean version which uses key points. The two sets of points are related using a transformational matrix. This allows the unclean, screen version to be edited. Manipulations, or editing, of the unclean version are mapped to the clean version, which is controlled by the recognizer. Changes to the clean version are mapped back into the uncleaned version. For example, moving a free-form line segment of a free-form figure away from the main body of the figure is accomplished in the clean version. Changes in that version are mapped back into the screen version. This allows the screen version to maintain its free-form character, while allowing editing to be carried out in the clean form. In this example, part of the object may be stretched in its underlying clean representation, while the displayed version of the unclean version maintains a free-form appearance for the stretched object.

APPENDIX

Recognition Classes

This section provides descriptions and explanations of various object-oriented classes used in recognition and requires some knowledge of object-oriented programming. The sequences of computer code used to implement the methods and systems of the invention are compatible with both Think C 5.0 and C++ and observe the object-oriented programming (OOP) conventions of these programming languages.

TController

The TController class provides methods for grouping and classifying recognition units, and for handling recognition areas.

Methods void RegisterDomain(TDomain *domain);

A domain's initialize method should call RegisterDomain, passing the domain returned by the Make method.

void NewGroup(TUnit *unit);

A domain's group method should call NewGroup after creating a new output unit and adding a piece to it with AddSub.

TUnitList *GetDelayList(TDomain *, ULong type);

GetDelayList returns a list of previously grouped pieces. A domain's Group method should call GetDelayList when a new piece comes in. The Group method can then analyze whether the new piece should be added to the group.

void NewClassification(TUnit *unit);

A domain's classify method should call NewClassification after classifying the units that have been grouped together and storing an interpretation in the output unit.

void BuildGTypes(TRecArea *newArea);

A program should call BuildGTypes after adding types to a recognition area with the TRecArea::AddAType method. BuildGTypes causes the controller to rebuild its cached list of recognizers.

flag DefaultGetAreasHit(TUnit *unit, TArray *areaList);

The controller calls this method if no program has implemented a GetAreasHit routine. See the description of recognition areas for more information.

void DefaultRegisterArea(TRecArea *newArea);

If a program wants the controller to keep track of screen areas and perform hit testing, it should call DefaultRegisterArea after calling BuildGTypes. If a program, or view system, maintains and hit-tests its own areas, it should not call DefaultRegisterArea.

void DefaultRemoveArea(TRecArea *newArea);

If a program has registered an area using DefaultRegisterArea, it should call RemoveArea when it is done with the area. RemoveArea does not dispose of the TRecArea object; it simply removes it from the controller's internal list.

TDomain

The TDomain class implements a recognizer.

Fields

TController *fController;

A pointer to the controller in charge of this domain. The controller passes this pointer to the Make method.

TTypeList *fPiece Types;

A list of the types of units, or pieces, that this domain accepts as input. The domain's initialization method should add types to this field using the AddPieceType method.

ULong fUnitType;

The type of the unit produced by this domain. The unit type is specified by the domain's Make method.

Char *fDomainName;

A pointer to a string that holds the domain's name. This name is currently used only for debugging purposes, but might eventually be used to control settings for a domain. The string should be descriptive, like "Word" or "Simple Shape". The domain name is specified by the domain's Make method.

ULong delay;

The amount of time, following a call to TSIUnit::AddSub, that the controller should wait before calling the domain's Classify method.

Methods static TDomain *Make(TController *c, ULong dUnitType, Char *dName);

The controller calls this method to create the single instance of the domain.

The controller passes, in c, a pointer to itself, so that the new domain can make calls to the controller. The dUnitType field specifies the type of unit that the domain will recognize. The dName field is a pointer to a string containing the name of the domain.

This is a static method, since there is no instance of the domain to call until one has been made. Because it is not a virtual method, domains that are subclassed from TDomain are free to change the interface to this method.

void IDomain(TController *c, ULong dUnitType, Char *dName);

A domain's Make method should call IDomain to perform all initialization. The parameters passed to IDomain are identical to those passed to Make. Because it is not a virtual method, subclasses can define their own interfaces to this method.

virtual void Dispose(void);

The controller calls Dispose to dispose of a domain. A domain that allocates any additional fields should release this memory in the Dispose method.

virtual flag Group(TUnit *piece, handle domainInfo);

The controller calls Group whenever a unit of a type requested by the domain as input is received.

virtual void Classify(TUnit *unit);

The controller calls Classify when the delay, if specified, has occurred, or after the Group method calls TSIUnit::EndSub.

virtual void Dump(TMsg *msg):

Dump is used for debugging porpoises; see the TMsg class for a description of its use.

virtual void DumpName(TMsg *mSg);

DumpName is used for debugging purposes; see the TMsg class for a description of its use.

virtual ULong SizeInBytes(void);

SizeInBytes is used for debugging purposes. It returns the total size, in bytes, of the TDomain and all of its data. Subclasses of TDomain that store allocated structures should override this method to compute the size of their stored structures, add it to the inherited SizeInBytes, and return.

void AddPieceType(ULong sub);

A domain should call AddPieceType to specify a unit type that it accepts as input.

TRecArea

The TRecArea class, a subclass of TObject, represents a screen recognition area. It specifies an area of the screen and the type(s) of units to be recognized in that area.

Fields

ULong flags;

Used by the controller to implement different types of areas. A view system may store whatever it likes in this field.

ULong area;

Used by the controller to store a structure representing the recognition area. A view system may store whatever it likes in this field.

TTypeAssoc *atypes;

A list of arbitration types—the recognized units requested by this area—that's maintained by the controller. With each element in this list, the controller also stores the handler routine to be called when that particular type is recognized, as well as any global data to be passed back.

TTypeAssoc *gtypes;

A list of grouping types—the units that must be recognized on the way to recognizing the requested arbitration types—that's maintained by the controller. When a grouping type unit is recognized, it is automatically passed on to the next level of recognition.

Methods

There are a number of methods that can be called by the application to assist in using TRecAreas.

static *Make(ULong area, ULong flags);

Make creates a new TRecArea object. A view system can store anything it wants in the area and flags fields. If a program wants the controller to keep track of the areas and perform hit-testing, it should pass a rectShape describing the area and a constant indicating the type of area. The following constants are defined:

| #define | defaultArea | 0x80000000 |
| #define | priorityArea | 0x40000000 |
| #define | alwaysArea | 0x20000000 |

A view system can store anything it wants in the area and flags fields.

void Dispose(void);

Call Dispose to dispose of the storage allocated for the TRecArea object. Be sure that you have first disposed of any allocated structures that you stored in the flags or area fields. If multiple views contain references to the same TRecArea, be sure to call Dispose only once.

void AddAType(ULong atype, ULong (*Handler) (TSIUnit *, ULong, dInfoRec *), dInfoRec *dInfo);

AddAType adds a type, specified by atype, to the atypes list in the TRecArea. It passes a pointer to the handler routine that should be called when units of this type are recognized. The dInfo parameter lets you pass a dInfoRec containing global information; this information is then passed back to the handler routine. If you have no global data, pass 0 for dInfo. When you are done adding types, call the TController::BuildGTypes method so the controller can build its list of recognizers to call on the way to recognizing the requested types.

TSIUnit

Class TSIUnit, a subclass of TUnit, provides the mechanism for adding subunits and interpretations.

A domain's Group method adds elements to this list with the AddSub method. After the domain has added the last subunit to this unit, it should call EndUnit. If a domain wants to know the number of su- units in this list, it should call SubCount(). To get one of the units, it should call GetSub(i), where i is the index of the subunit. New interpretations are generally added to the unit by calling AddInterpretation. The number of interpretations that a unit has can be discovered by calling InterpretationCount(). An interpretation can be accessed by calling Getinterpretation(i), where i is the index of the interpretation.

Fields

TArray *fSubs;

A list of the subunits of which this unit is composed.

TDArray *fInterpretations;

A list of the interpretations of the classified unit.

Methods static TSIUnit *Make( TDomain *domain, ULong type, TArray *areaList, ULong interpSize);

This static method creates and initializes a new instance of a TSIUnit.

void ISIUnit(TDomain *domain, ULong type, TArray *areaList, ULong interpSize);

This method is called to initialize a TSIUnit. It is generally called by the initialize method of one of the subclasses of TSIUnit. The domain parameter is stored in the unit, so that the controller can discover the origin of the unit. The type field is stored in the unit's fUType field, and it identifies the type of the unit itself. The fareaList parameter is generally just the fareaList from the first subunit that will be added to the unit. It will be stored directly into the fAreaList field of the unit.

virtual void Dispose(void);

This method must be called to dispose of a unit that has not had either NewClassification or NewGroup called on it. Units that have been passed to recognition in this way must be claimed by calling controller->ClaimUnits(unit). This is generally done by the application after it accepts an interpretation of a classified unit. Recognizers will not need to override this method.

virtual void IDispose(void);

This method disposes of the subunit list (but not its elements), and the interpretations list, then it calls TUnit::IDispose() to complete disposal of this object. If your unit allocates any additional data that needs to be disposed, then you will need to override this method.

virtual ULong SizeInBytes(void);

This method is for debugging purposes. It returns the size of the TSIUnit and all of its allocated structures. If your subclass of TSIUnit allocates any structures that need to be disposed, then you should override this method and add the sum of the sizes of the allocated fields to the value returned by TSIUnit::SizeInBytes() and return that sum. There are methods defined for computing the sizes of most structures defined by the recognition system. Call these to get their sizes.

virtual ULong AddSub(TUnit *unit);

A recognizer calls AddSub to add the specified subunit. AddSub updates the unit's field (defined in the TUnit superclass). You will not need to override this method.

virtual TUnit *GetSub(ULong subIndex);

GetSub returns the specified subunit from the unit's fSubs list. The elements are indexed from 0. If you request an invalid index, 0 is returned.

virtual void EndSubs(void);

A recognizer should call EndSubs when it's done adding subunits to (usually in the domain's Group method). End- Subs compacts the fSubs list and resets the unit's **fEndTime field so that the unit is immediately classified. You may want to override this method, if your unit contains other allocated structures that you want to dispose of or compact at the end of classification.

virtual ULong InterpretationCount(void);

InterpretationCount returns the current number of interpretations. If you use the standard interpretation interface, you won't need to override this method. If you store interpretations in a private format, you will need to override this method.

virtual ULong AddInterpretation(ptr iPtr);

A recognizer's Classify method calls AddInterpretation to add a new interpretation to the unit. The pointer is simply a pointer to the desired interpretation data. Since the size of an interpretation is specified when the unit is created, the right amount of data is copied into the new interpretation.

The following methods are for accessing fields and have self-evident functions. These functions are not virtual and cannot be overwritten.

virtual UnitInterpretation *GetInterpretation(ULong index);
    virtual flag CheckInterpretationIndex(ULong index);
    virtual flag DeleteInterpretation(ULong index);
    virtual ULong GetBestInterpretation(void);
    virtual void InterpretationReuse(ULong inum, ULong paramSize, ULong nParams);
    virtual ULong GetLabel(ULong index);
    virtual fixed GetScore(ULong index);
    virtual fixed GetAngle(ULong index);
    virtual TArray *GetParam(ULong index);
    virtual void SetScore(ULong index, fixed score);
    virtual void SetAngle(ULong index, fixed angle);
    // virtual methods overwritten
    virtual ULong SubCount(void);
    virtual void EndUnit(void);
    virtual void Dump(TMsg *msg);
    virtual void ClaimUnit(TUnitList *);

TUnit

Class TUnit is the basic recognition unit class. The output of a recognizer is an object of class TUnit or of one of the TUnit subclasses. Only primative objects, such as clicks keystrokes, and other potential forms of input to the system, are instances of this class. The fields and methods defined by the TUnit class are fundamental to the recognition process, however, and used by all objects that are subclassed from it.

Fields (protected)

TDomain *fDomain

A pointer to the domain that created the TUnit (or subclass). The controller uses this pointer to call back the domain's Classify method.

ULong fUType

The type of unit, currently represented by a unique four character sequence (like 'STRK,' 'CHAR,' and 'WORD.'

ULong fPriority

Provided for specifying a priority value.

ULong fStartTime

The time (currently Ticks) at which the unit was created.

ULong fEndTime

The time (currently Ticks) at which thelast sub-unit was added (using the TSIUnit::AddSub method).

ULong fDelay

Amount of delay for this unit.

ULong fRefCount

Used internally to implement the Clone method.

TArray *fAreaList

Used internally, a list of all the recognition areas hit by the unit.

rectangle fBBox

A rectangle, aligned to screen coordinates, that is guaranteed to completely enclose all the strokes that are owned by the unit. If the object is a word, for instance, this rectangle describes the area that should be erased to remove the object from the screen. This box does not necessarily correspond to the size or shape of the actual recognized object.

Fields (public)

ULong flags

The fFlags field (inherited from class TObject) contains information about the status of a unit. The following flag values are defined:

| #define | constantUnit   | 0x80000000 |
|---------|----------------|------------|
| #define | claimedUnit    | 0x40000000 |
| #define | partialUnit    | 0x20000000 |
| #define | delayUnit      | 0x10000000 |
| #define | invalidUnit    | 0x08000000 |
| #define | busyUnit       | 0x04000000 |
| #define | tryHarderUnit  | 0x02000000 |
| #define | noTryHarderUnit| 0x01000000 | constantUnit: Prevents the unit from being claimed and disposed of.

claimedUnit: Marks the unit, its sub-units, and any other units that have claimed units as their sub-units, as disposable. Area handlers should not set this flag directly, but should instead call the TController::ClaimUnits method.

partialUnit: Marks a unit that is known not to be complete and prevents the unit from being classified. For instance, a recognizer might know that a character unit contains the first two strokes of an 'E'. A recognizer that does not explicitly set a delay may want to set this flag if it needs to delay the classification of a particular unit that it has created (in its Group method) and put into the unit pool (using NewGroup).

delayUnit: Delays classification of a unit until a specified amount of time has elapsed. This flag is used by the controller to maintain the delay specified by a recognizer.

busyUnit: This flag prevents the controller from disposing of a unit, even after it has been claimed.

tryHarderUnit: Set by the controller when it passes a unit back to an area handler a second time. For example, an area might accept text or graphics. The graphics handler might not claim a unit because it seems too small. If the text handler also rejects the unit, the controller might pass the unit back to the graphics handler with the tryHarderUnit flag set.

noTryHarderUnit: Prevents the controller from calling back an area handler a second time. For instance, training application might want to set this flag.

Long fNStrokes

The number of strokes of which the unit is composed. This field is set when NewClassification is called. It contains the number of strokes that the object is made up of.

Long fMinStroke, fMaxStroke

These two fields are hints to the controller to help it efficiently determine the value of nStrokes for a unit that is a parent of this unit in the future. Note that nStrokes does not necessary equal maxStroke-minStroke.

Methods static TUnit *Make(TDomain *domain, ULong type, TArray *areaList);

Make creates a new TUnit. The domain parameter indicates the domain that actually created the unit. If the unit was not created by a domain, this field may be set to 0. The type parameter is placed in the type field of the unit, and the areaList parameter is placed in the fareaList field of the unit. This is not a virtual method, so subclasses of TUnit are free to redefine the interface to their Make methods.

void IUnit(TDomain *domain, ULong type, TArray *areaList);

IUnit is called by Make to initialize the unit. Its parameters are the same as those passed to Make. IUnit should be called by the initialize methods of subclasses of TUnit. This is not a virtual method, so subclasses of TUnit are free to redefine the interface to their initialize methods.

virtual void Dispose(void);

This method is called to dispose of the TUnit object. Subclasses will only need to override this method if they allocate data structure of their own that is stored directly in the unit. Once an object that is subclassed from TUnit has been put into the recognition system (using NewGroup or NewClassification), you should never call this method directly. Instead, you should call ClaimUnits(unit), and the unit will be disposed of at a safe time.

virtual void IDispose(void);

virtual ULong SizeInBytes(void);

This method is for debugging purposes only. It should return the size, in bytes occupied by this unit, all of its owned structures, including its interpretations, but not including its subunits. A subclass of TUnit only needs to override this method if it stores allocated structures in the unit itself.

virtual void Clone(void);

This method causes the reference count in the unit to be incremented. This method should never need to be overwritten. Every call to Clone must be balanced by a call to Dispose, or the object will never be disposed.

virtual flag Release(void);

This method should be called by each Dispose method to determine whether or not to actually dispose of the object. It returns true if the object should be disposed, otherwise the Dispose method can simply return.

virtual ULong SubCount(void);

If the unit is a TUnit, SubCount always returns 0. If the unit is a subclass of TSIUnit, then SubCount returns the number of elements in the subs array.

virtual ULong InterpretationCount(void);

If the unit is a TUnit, this method returns 0. If the unit is a subclass of TSIUnit, then it returns the number of interpretations in the interpretations array. If your subclass of TUnit stores a single interpretation within the unit itself, then it should probably return 1 and implement all the appropriate interpretation methods.

virtual ULong GetBestInterpretation(void);

This method searches through the list of interpretations and returns the index of the one with the best score. You probably won't need to override this method.

virtual void Dump(TMsg *msg);

Dump is used for debugging purposes; see the TMsg class for a description of its use.

virtual void DumpName(TMsg *msg);

DumpName is used for debugging purposes; see the TMsg class for a description of its use.

virtual void ClaimUnit(TUnitList *);

ClaimUnit is called by the TController::ClaimUnits method; it shouldn't need to be called directly. If the unit is a TSIUnit, ClaimUnit calls itself recursively on all of its subunits, and then marks itself as claimed (setting the claimUnit flag in the flags field). If the unit is a TUnit, then it simply marks itself as claimed.

An application should claim a unit only if accepts an interpretation of the unit that is passed to it by the Arbiter. It should first extract all desired information from the unit or its interpretation, and then call ClaimUnits. Once ClaimUnits has been called on a unit, the unit is volatile and may disappear.

virtual void Invalidate(void);

Invalidate sets the invalid unit flag in the unit's flags field. A recognizer might call Invalidate after deciding that a particular grouping that it had previously proposed has become invalid. For instance if a single vertical stroke is categorized as a character unit with interpretation 'I', and a subsequent stroke crosses it, the recognizer might invalidate the 'I' unit and create a 't' unit instead.

The next set of methods are just for field access. They are not virtual functions so they can't be overwritten.

TDomain *GetDomain(void);

Call GetDomain to obtain a pointer to the domain that created the TSIUnit.

ULong GetDelay(void):
void SetDelay(ULong);
ULong GetType(void);
void SetType(ULong);
ULong GetPriority(void);
void SetPriority(ULong priority);
ULong GetTime(void)
void SetTime(ULong);
TArray *GetAreas(void);
void SetAreas(TArray *);
void SetBBox(rectangle *r);
rectangle *GetBBox( rectangle *r);
Long CheckOverlap(TUnit *a, TUnit *b);// return overlap status of two units
Long CountStrokes(TUnit *a);
Long CountOverlap(TUnit *a, TUnit *b);
void MarkStrokes(TUnit *a, char *ap, Long min);

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. It is therefore intended that the following appended claims include all such alterations, modifications and permutations as fall within the true spirit and scope of the present invention.

We claim:

1. A system for recognizing user input to a computer from a user input device, comprising:

input means for receiving user input data in the form of a signal from a user input device chosen from the group consisting essentially of a tablet input device and a voice input device;

means for storing said user input data in memory of said computer system;

a hierarchy of independent recognition domains, each of said hierarchy of independent recognition domains comprising group means and classify means, including:

a first recognition domain for receiving a portion of said user input data as a first recognition domain input and performing character-related recognition on the user input data only if the user input data is of the type expected in a screen recognition area and generating one or more active character-related hypotheses, each of said active character-related hypotheses comprising a portion of said user input data together with a character-related interpretation of said user input data;

a second recognition domain for receiving at least one of said active character-related hypotheses as a second recognition domain input and performing word-related recognition on the user input data only if the user input data is of the type expected in said screen recognition area and generating one or more active word-related hypotheses, at least one of said active word-related hypotheses being derived from said one of said active character-related hypotheses;

a third recognition domain for receiving a portion of said user input data as a third recognition domain input and performing shape part recognition on the user input data only if the user input data is of the type expected in said screen recognition area and generating one or more active shape-pan-related hypotheses, each of said shape-part-related hypotheses comprising a portion of said user input data together with a shape-part-related interpretation of said user input data; and a fourth recognition domain for receiving at least one of said active shape-part-related hypotheses as a fourth recognition domain input and performing shape recognition on the user input data only if the user input data is of the type expected in said screen recognition area and generating one or more active shape-related hypotheses, at least one of said active shape-related hypotheses being derived from said one of said active shape-part-related hypotheses;

means for storing said active hypotheses in a database comprising a piece pool and a unit pool in said memory of said computer system;

a control unit including:

first control means for managing the means for storing active hypotheses, said first control means further including means for removing a previously stored hypothesis from said database, said means for removing further removes a hierarchy of hypotheses from which said previously stored hypothesis is derived, down to constituent strokes as well all other hypotheses in said database that refer to said constituent strokes; and second control means for scheduling the recognition tasks in said recognition domains;

arbiter means for resolving multiple active hypotheses from said recognition domains and choosing a recognition result among said multiple active hypotheses from said recognition domains; and a user output device for communicating to said user said recognition result.

2. The system of claim 1 wherein said group means groups domain inputs into groups, said classify means generates one or more hypotheses from said groups and being a lower priority task than said group means, said classify means being activated after a settable delay time period following a completion of a grouping task by said group means.

3. The system of claim 2 wherein said group means includes:

means for identifying one or more groups of related domain inputs using domain grouping knowledge;

means for generating a unit with no hypothesis for each group and storing said unit in the database; and means for storing units with no hypothesis in said piece-pool; and wherein said classify means includes:

means for receiving each unit generated by the grouping means and providing a unit with a hypothesis; and means for storing units with one or more hypothesis in said unit pool.

4. The system of claim 2 wherein said second recognition domain further comprises means for combining at least two interpretations from said one or more active character-related hypotheses to form a higher level interpretation for one of said active word-related hypotheses.

5. The system of claim 4 wherein said hierarchy of independent recognition domains comprises multiple, independent recognition domains organized into a hierarchical structure based upon hierarchy information, said hierarchy information comprises information about domain inputs and information about which type of hypothesis the domain generates so that the type of input hypotheses for a domain establishes its position in said hierarchical structure.

6. The system of claim 5 wherein each of said hierarchy of independent recognition domains further comprises means for preventing hypothesis proliferation, said means for preventing hypothesis proliferation keeps the number of hypotheses a recognition domain proposes under a given limit.

* * * * *

UNITED STATES PATENT AND TRADEMARK OFFICE
CERTIFICATE OF CORRECTION

PATENT NO. : 5,463,696
DATED : October 31, 1995
INVENTOR(S) : Beernink et al.

It is certified that error appears in the above-indentified patent and that said Letters Patent is hereby corrected as shown below:

Column 39, line 33, replace "shape-pan-related" with -- shape-part-related --

Signed and Sealed this

Twentieth Day of February, 1996

Attest:

BRUCE LEHMAN

Attesting Officer

Commissioner of Patents and Trademarks